United States Patent
Omont et al.

(10) Patent No.: US 11,661,834 B2
(45) Date of Patent: May 30, 2023

(54) MONITORING HEALTH OF ADDITIVE SYSTEMS

(71) Applicant: Schlumberger Technology Corporation, Sugar Land, TX (US)

(72) Inventors: Gregoire Omont, Houston, TX (US); Rajesh Luharuka, Sugar Land, TX (US); Corey Ray, Richmond, TX (US); Jonathan Wun Shiung Chong, Richomond, TX (US); Chuong Nguyen, Richmond, TX (US); Lewis Callaway, Houston, TX (US); Liang Du, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 16/924,417

(22) Filed: Jul. 9, 2020

(65) Prior Publication Data
US 2020/0347713 A1    Nov. 5, 2020

Related U.S. Application Data

(63) Continuation of application No. 15/500,839, filed as application No. PCT/US2015/043062 on Jul. 31, 2015, now abandoned.
(Continued)

(51) Int. Cl.
*E21B 44/00* (2006.01)
*G06Q 50/02* (2012.01)
(Continued)

(52) U.S. Cl.
CPC .......... *E21B 44/005* (2013.01); *E21B 21/062* (2013.01); *E21B 33/13* (2013.01);
(Continued)

(58) Field of Classification Search
CPC ........ E21B 21/062; E21B 21/16; E21B 33/13; E21B 33/138; E21B 43/162;
(Continued)

(56) References Cited

U.S. PATENT DOCUMENTS 6,851,444 B1   2/2005  Kohl et al.
7,234,524 B2   6/2007  Shaw et al.
(Continued)

FOREIGN PATENT DOCUMENTS

WO    2012001653 A2    1/2012

OTHER PUBLICATIONS

Bannikov et al. "Predicting Just in Time: Prognostic Health Management for Oilfield Equipment," SPE-202957-MS (Year: 2020).*
(Continued)

*Primary Examiner* — John Fitzgerald
(74) *Attorney, Agent, or Firm* — Jeffrey D. Frantz

(57) ABSTRACT

A monitoring system operable to monitor an oilfield additive system having multiple components. The oilfield additive system is operable to transfer an additive-containing substance for injection into a wellbore. The monitoring system includes sensors each associated with, and operable to generate information related to an operational parameter of, a corresponding one of the oilfield additive system components. The monitoring system also includes a monitoring device in communication with the sensors and operable to record the information generated by the sensors to generate a database. The database includes information indicative of maintenance aspects of the oilfield additive system and/or the oilfield additive system components.

19 Claims, 5 Drawing Sheets

Related U.S. Application Data

(60) Provisional application No. 62/032,158, filed on Aug. 1, 2014.

(51) Int. Cl.

| | | |
|---|---|---|
| *E21B 21/06* | (2006.01) | |
| *E21B 33/13* | (2006.01) | |
| *G06Q 10/20* | (2023.01) | |
| *E21B 43/26* | (2006.01) | |
| *E21B 33/138* | (2006.01) | |
| *E21B 43/16* | (2006.01) | |
| *E21B 43/247* | (2006.01) | |
| *E21B 43/25* | (2006.01) | |
| *E21B 43/267* | (2006.01) | |
| *E21B 21/16* | (2006.01) | |

(52) U.S. Cl.
CPC .......... *E21B 33/138* (2013.01); *E21B 43/162* (2013.01); *E21B 43/247* (2013.01); *E21B 43/255* (2013.01); *E21B 43/2607* (2020.05); *E21B 43/267* (2013.01); *G06Q 10/20* (2013.01); *G06Q 50/02* (2013.01); *E21B 21/16* (2013.01)

(58) Field of Classification Search
CPC ...... E21B 43/247; E21B 43/255; E21B 43/26; E21B 43/267; E21B 43/40; E21B 44/005; G06Q 10/20; G06Q 50/02
See application file for complete search history.

(56) References Cited

U.S. PATENT DOCUMENTS

| | | | |
|---|---|---|---|
| 7,389,787 B2 | 6/2008 | Means et al. | |
| 7,711,486 B2* | 5/2010 | Thigpen | E21B 43/128 |
| | | | 702/9 |
| 8,682,589 B2 | 3/2014 | Thigpen et al. | |
| 9,324,049 B2* | 4/2016 | Thomeer | E21B 41/0092 |
| 9,708,906 B2 | 7/2017 | Flores et al. | |
| 9,797,395 B2 | 10/2017 | Urdaneta et al. | |
| 9,875,459 B2 | 1/2018 | Altamirano et al. | |
| 9,970,278 B2 | 5/2018 | Broussard et al. | |
| 10,740,730 B2* | 8/2020 | Altamirano | G06Q 10/06316 |
| 10,970,590 B2* | 4/2021 | Luharuka | H04N 7/181 |
| 2004/0168811 A1 | 9/2004 | Shaw et al. | |
| 2006/0162962 A1 | 7/2006 | Koederilz et al. | |
| 2007/0289740 A1 | 12/2007 | Thigpen et al. | |
| 2008/0179056 A1* | 7/2008 | Dykstra | E21B 43/267 |
| | | | 166/250.15 |
| 2008/0183415 A1* | 7/2008 | Dykstra | E21B 44/00 |
| | | | 166/250.01 |
| 2009/0105059 A1 | 4/2009 | Dorry et al. | |
| 2010/0050017 A1 | 2/2010 | Almadi et al. | |
| 2010/0126717 A1 | 5/2010 | Kuchuk et al. | |
| 2010/0242586 A1 | 9/2010 | Elshahawi et al. | |
| 2011/0168389 A1 | 7/2011 | Meijs et al. | |
| 2011/0214919 A1 | 9/2011 | McClung | |
| 2012/0203507 A1* | 8/2012 | Thomeer | E21B 41/0092 |
| | | | 702/183 |
| 2013/0284913 A1 | 10/2013 | Pinappu et al. | |
| 2013/0290064 A1* | 10/2013 | Altamirano | G06Q 10/06316 |
| | | | 705/7.26 |
| 2014/0095114 A1 | 4/2014 | Thomeer et al. | |
| 2014/0216736 A1 | 8/2014 | Leugemors et al. | |
| 2015/0084767 A1 | 3/2015 | Saruwatari et al. | |
| 2015/0167661 A1 | 6/2015 | Garvey et al. | |
| 2015/0186206 A1 | 7/2015 | Bhattacharya et al. | |
| 2015/0356521 A1 | 12/2015 | Sridhar et al. | |
| 2016/0239220 A1 | 8/2016 | Yu et al. | |
| 2016/0320347 A1* | 11/2016 | Moakler | G01H 1/003 |
| 2017/0067334 A1 | 3/2017 | Fripp et al. | |
| 2017/0109684 A1 | 4/2017 | Liu | |
| 2017/0292513 A1 | 10/2017 | Haddad et al. | |
| 2018/0181830 A1 | 6/2018 | Luharuka et al. | |

OTHER PUBLICATIONS

Veil et al., "Evaluation of slurry injection technology for management of drilling wastes", U.S. Department of Energy National Petroleum Technology Office, May 2003, 110 pages.

\* cited by examiner

MONITORING HEALTH OF ADDITIVE SYSTEMS

CROSS-REFERENCE TO RELATED APPLICATIONS

This is a continuation application of U.S. application Ser. No. 15/500,839, entitled "Monitoring Health of Additive Systems," filed on Jan. 31, 2017, which claims the benefit of and priority to International Application No. PCT/US15/43062, entitled "Monitoring Health of Additive Systems," filed on Jul. 31, 2015, which claims the benefit of and priority to U.S. Provisional Application No. 62/032,158, entitled "Prognosis and Health Management (PHM) Implementation on Additive Systems," filed on Aug. 1, 2014, the entire disclosures of which are hereby incorporated herein by reference.

BACKGROUND OF THE DISCLOSURE

In oilfield operations, additive systems are utilized at wellsites to blend and/or inject additives or other material into a wellbore. Such operations may include drilling, cementing, acidizing, water jet cutting, and hydraulic fracturing of subterranean formations. In some additive systems, several pumps or other material transfer devices may be connected in parallel and/or in series to transfer the material from a storage container into the wellbore. Additive systems further include valves, actuators, flow meters, and/or mixing devices that facilitate the transfer and combining of the materials, while in solid and/or liquid form, prior to being injected into the wellbore.

The success of the additive system operations may be related to many factors, including failure rates. Due to high frequency of use, high pressures, and abrasive properties of certain materials, portions of the additive systems may wear out and fail. Such failures result in operation stoppages and severe damage to other components. In some instances, oilfield operations may have to be repeated at large monetary costs and loss of production time.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an apparatus that includes a monitoring system that monitors an oilfield additive system. The oilfield additive system transfers an additive-containing substance for injection into a wellbore, and includes multiple components each associated with a corresponding operational parameter. The monitoring system includes sensors and a monitoring device. Each sensor is associated with, and generates information related to the operational parameter of, a corresponding one of the oilfield additive system components. The monitoring device is in communication with each of the sensors, and records the information generated by the sensors to generate a database indicative of a maintenance aspect of the oilfield additive system and/or one or more of the oilfield additive system components.

The present disclosure also introduces a method that includes transferring an additive-containing substance for injection into a wellbore with an oilfield additive system. The oilfield additive system includes components each associated with a corresponding operational parameter. The method also includes generating information related to the operational parameter of each of the oilfield additive system components with corresponding sensors. The information generated by the sensors is recorded with a monitoring device to generate a database indicative of a maintenance aspect of the oilfield additive system and/or one or more of the oilfield additive system components.

The present disclosure also introduces a system that includes an oilfield additive system and a monitoring system that monitors the oilfield additive system. The oilfield additive system includes multiple components, and is operable to transfer a material for injection into a wellbore. The monitoring system includes sensors each associated with, and operable to generate information related to operational parameters of, a corresponding one of the oilfield additive system components. The monitoring system also includes a monitoring device in communication with each of the sensors. The monitoring device records the information generated by the sensors to generate a database indicative of a maintenance aspect of the oilfield additive system and/or one or more of the oilfield additive system components.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
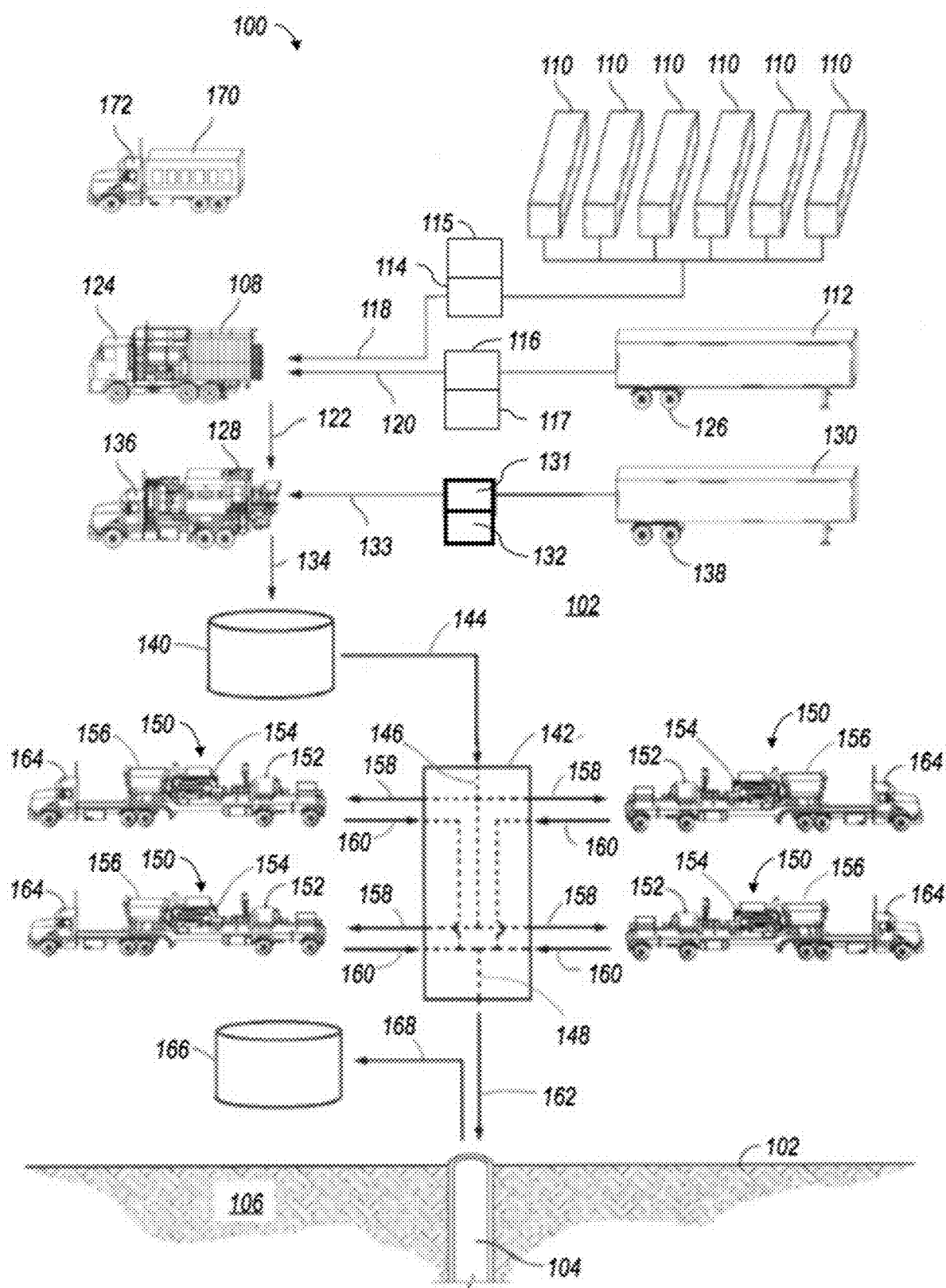
FIG. 1 is a schematic view of at least a portion of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of at least a portion of an example additive system 100 according to one or more aspects of the present disclosure. The figure depicts a wellsite surface 102 adjacent to a wellbore 104 and a partial sectional view of the subterranean formation 106 penetrated by the wellbore 104 below the wellsite surface 102. The additive system 100 may be operable to transfer an additive or other material from a source location to a destination location for blending or mixing with another additive or material and eventual injection into the wellbore 104. The additive system 100 may comprise a first mixer 108 connected with one or more first containers 110 and a second container 112. The second container 112 may contain a first additive and the first containers 110 may contain water or another liquid comprising water. When the additive system 100 is operable as a fracturing system, the first additive may be or comprise a hydratable material or gelling agent, such as guar, a polymer, a synthetic polymer, a galactomannan, a polysaccharide, a cellulose, and/or a clay, among other examples, and the liquid may be or comprise an aqueous fluid, which may comprise water or an aqueous solution comprising water, among other examples. When the additive system 100 is operable as a cementing system, the first additive may be or comprise cement powder.

The liquid may be transferred from the first containers 110 to the first mixer 108 by a first material transfer device 114, such as may be driven by a first prime mover 115. The first material transfer device 114 may be or comprise a pump, while the prime mover 115 may be or comprise an electric motor, an engine, or another rotary actuator. The first additive may be transferred from the second container 112 to the first mixer 108 by a second material transfer device 116, such as may be driven by a second prime mover 117. The second material transfer device 116 may be or comprise a conveyer, a bucket elevator, or a feeding screw, while the second prime mover 117 may be or comprise an electric motor, an engine, or another rotary actuator. The first mixer 108 may be operable to receive the first additive and the liquid via two or more conduits 118, 120, and mix or otherwise combine the first additive and the liquid to form a base fluid. The first mixer 108 may then discharge the base fluid via one or more conduits 122.

The first mixer 108 and the second container 112 may each be disposed on corresponding trucks, trailers, and/or other mobile carriers 124, 126, respectively, such as may permit their transportation to the wellsite surface 102. However, the first mixer 108 and/or second container 112 may be skidded or otherwise stationary, and/or may be temporarily or permanently installed at the wellsite surface 102.

The additive system 100 may further comprise a second mixer 128 fluidly connected with the first mixer 108 and a third container 130. The third container 130 may contain a second additive that may be substantially different than the first additive. When the additive system 100 is operable as the fracturing system, the second additive may be or comprise a proppant material, such as sand, sand-like particles, silica, quartz, and/or propping agents, among other examples. When the additive system 100 is operable as the cementing system, the second additive may be or comprise accelerators, retarders, fluid-loss additives, dispersants, extenders, weighting agents, lost circulation additives and/or other chemicals or materials operable to modify the characteristics of the base fluid. The second additive may be a solid material (e.g., particulate material, powder) or a liquid.

The second additive may be transferred from the third container 130 to the second mixer 128 by a second material transfer device 131 driven by a third prime mover 132. The third material transfer device 131 may be or comprise a pump when the second additive is a liquid, or the third material transfer device 131 may be or comprise a conveyer, a bucket elevator, or a feeding screw when the second additive is a solid material. The third prime mover 132 may be or comprise an electric motor, an engine, or another rotary actuator. The second mixer 128 may be operable to receive the base fluid from the first mixer 108 via one or more conduits 122, and a second additive from the third container 130 via one or more conduits 133, and mix or otherwise combine the base fluid and the second additive to form a mixture. The mixture may comprise a fracturing fluid when the additive system 100 is operable as the fracturing system, or the mixture may comprise a cement slurry when the additive system 100 is operable as the cementing system. The second mixer 128 may then discharge the mixture via one or more conduits 134.

The second mixer 128 and the third container 130 may each be disposed on corresponding trucks, trailers, and/or other mobile carriers 136, 138, respectively, such as may permit their transportation to the wellsite surface 102. However, the second mixer 128 and/or third container 130 may be skidded or otherwise stationary, and/or may be temporarily or permanently installed at the wellsite surface 102.

The mixture may be communicated from the second mixer 128 to a fourth container 140, which may be or comprise a mixing, displacement, or storage tank for the mixture prior to being injected into the wellbore 104. The mixture may be communicated from the fourth container 140 to a common manifold 142 via the one or more conduits 144. The common manifold 142 may comprise a combination of valves and/or diverters, as well as a suction line 146 and a discharge line 148, such as may be collectively operable to direct flow of the mixture in a selected or predetermined manner. The common manifold 142, which may be known in the art as a missile or a missile trailer, may distribute the mixture to a pump fleet. The pump fleet may comprise multiple pump assemblies 150 each comprising a pump 152, a prime mover 154, and a heat exchanger 156. Each pump assembly 150 may receive the mixture from the suction line 146 of the common manifold 142, via one or more conduits 158, and discharge the mixture under pressure to the discharge line 148 of the common manifold 142, via one or more conduits 160.

The pump assemblies 150 may each be mounted on corresponding trucks, trailers, and/or other mobile carriers 164, such as may permit their transportation to the wellsite surface 102. However, the pump assemblies 150 may be skidded or otherwise stationary, and/or may be temporarily or permanently installed at the wellsite surface 102.

The mixture may then be discharged from the common manifold 142 into the wellbore 104 via one or more conduits 162, such as may include various valves, conduits, and/or other hydraulic circuitry fluidly connected between the common manifold 142 and the wellbore 104. During operations, the mixture and/or wellbore fluid may be ejected from the wellbore 104 and communicated to a fifth container 166 via one or more conduits 168. Although the additive system 100 is shown comprising a fourth container 140, it is to be understood that the fourth container 140 may not be included as part of the additive system 100, such that the mixture may be communicated from the second mixer 128 directly to the common manifold 142. The additive system 100 may also omit the common manifold 142, and the conduits 160 may be fluidly connected to the wellbore 104 via a wellhead (not shown) and/or other means.

The additive system 100 may also comprise a control center 170, which may be operable to monitor and control at least a portion of the additive system 100 during operations. Signals may be communicated between the control center 170 and other components of the additive system 100 via a local network. For example, the control center 170 may be operable to monitor and/or control the production rate of the mixture, such as by increasing or decreasing the flow of the liquid from the first containers 110, the first additive from the second container 112, the base fluid from the first mixer 108, the second additive from the third container 130, and/or the mixture from the second mixer 128. The control center 170 may also be operable to monitor health and/or functionality of the additive system 100. For example, the control center 170 may be operable to monitor and/or control operational parameters associated with the containers 110, 112, 130, 140, 166, the first and second mixers 108, 128, the material transfer assemblies 114, 116, 130, and/or the pump assemblies 150. The control center 170 may also be operable to monitor temperature, viscosity, density, and composition of the liquid contained in the first containers 110, the first additive, the second additive, and/or the mixture.

The control center 170 may be disposed on a corresponding truck, trailer, and/or other mobile carrier 172, such as may permit its transportation to the wellsite surface 102. However, the control center 170 may be skidded or otherwise stationary, and/or may be temporarily or permanently installed at the wellsite surface 102.

FIG. 1 depicts the additive system 100 as being operable to transfer additives and produce mixtures that may be pressurized and injected into the wellbore 104 during hydraulic fracturing or cementing operations. However, it is to be understood that the additive system 100 may be operable to transfer other additives and produce other mixtures that may be pressurized and injected into the wellbore 104 during other oilfield operations, such as drilling, acidizing, chemical injecting, and/or water jet cutting operations, among other examples.

Figure 2:
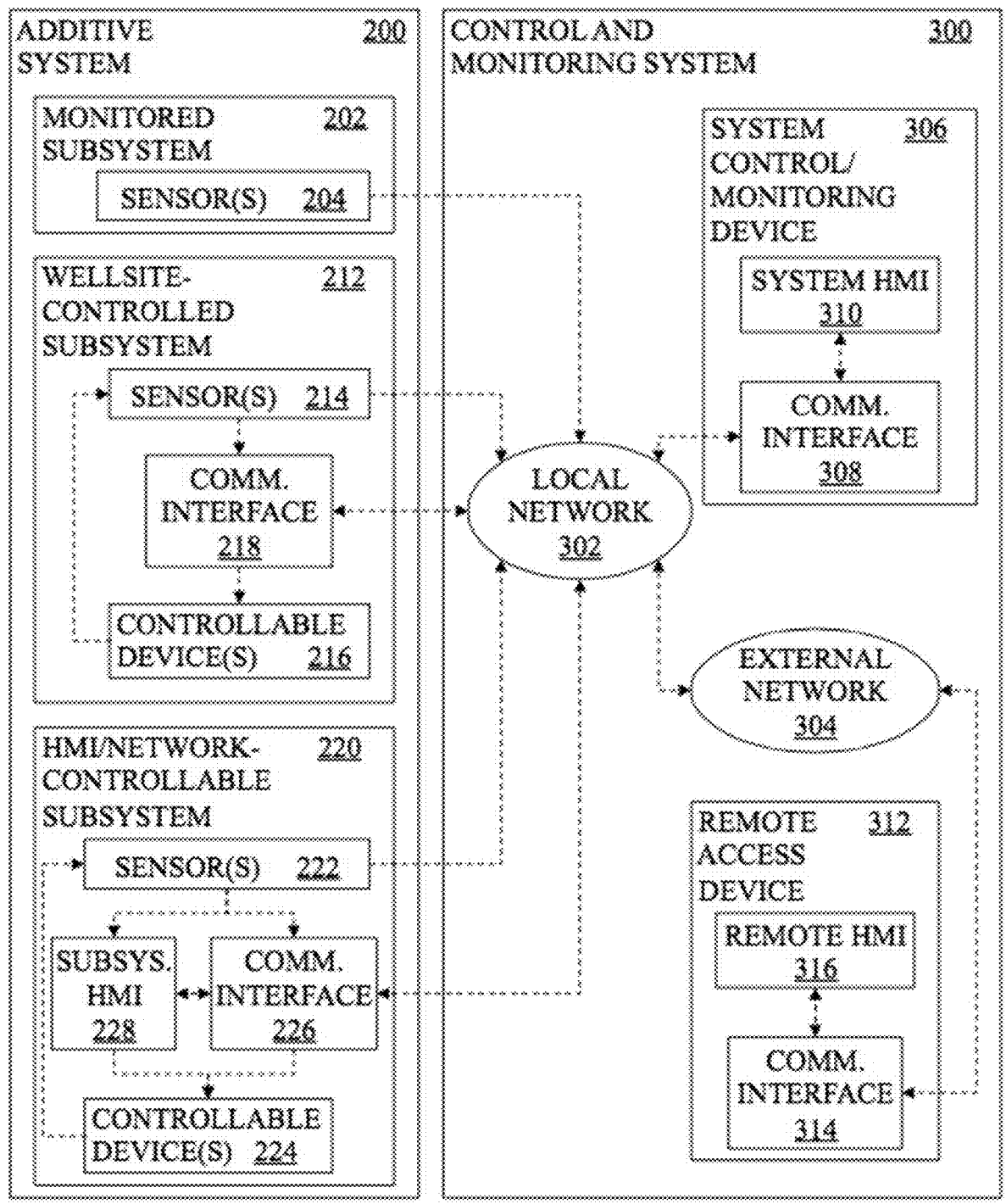
FIG. 2 is a schematic view of at least a portion of an apparatus according to one or more aspects of the present disclosure.

FIG. 2 is a schematic view of at least a portion of an example implementation of the additive system 100 shown in FIG. 1, designated in FIG. 2 by reference numeral 200, according to one or more aspects of the present disclosure. FIG. 2 also depicts an example implementation of a control and monitoring (CAM) system 300 according to one or more aspects of the present disclosure. At least portions of the additive system 200 shown in FIG. 2 may be substantially similar to corresponding portions of the additive system 100 shown in FIG. 1 and/or other additive systems within the scope of the present disclosure. The depicted implementation of the additive system 200 shown in FIG. 2 includes generic examples of the subsystems, components, and/or other portions of an additive system that may be in communication with the CAM system 300 according to one or more aspects of the present disclosure.

For example, the additive system 200 may comprise one or more monitored subsystems 202. Examples of the monitored subsystem 202 depicted in FIG. 2 may include the containers 110, 112, 130, 140 and/or other components and/or subsystems of the additive system 100 shown in FIG. 1 that may be monitored but not controlled via operation of the CAM system 300. Each monitored subsystem 202 comprises one or more sensors 204 each operable to monitor one or more parameters associated with that monitored subsystem 202. Each sensor 204 is operable to generate a signal or information related to operational parameters of the monitored subsystem 202, which may then be communicated to the CAM system 300 via a local network 302.

The local network 302 may be or comprise Ethernet, digital subscriber line (DSL), telephone, coaxial, cellular, and/or other types of networks. However, the local network 302 is implemented entirely at the wellsite, and does not include network nodes or other components that are located remote from the wellsite. The local network 302 may form a portion of the CAM system 300 and/or otherwise facilitate communication between one or more components of the CAM system 300 and one or more components of the additive system 200.

The additive system 100 may also comprise one or more wellsite-controlled (WC) subsystems 212. Each WC subsystem 212 comprises one or more sensors 214 each operable to monitor one or more parameters associated with that WC subsystem 212. For example, each sensor 214 may be operable to generate a signal or information related to operational parameters of one or more controllable devices 216 and/or other components or aspects of the WC subsystem 212, which may then be communicated to the CAM system 300 directly via the local network 302 or indirectly via a communication interface 218.

Examples of the WC subsystem 212 depicted in FIG. 2 may include the material transfer devices 114, 116, 131, the prime movers 115, 117, 132, and/or other components and/or subsystems of the additive system 100 shown in FIG. 1 that may be monitored via operation of the CAM system 300, and that have one or more controllable devices 216 that may be controlled via operation of the CAM system 300, but that do not include a subsystem human-machine interface (HMI) as described below. Thus, while the monitored subsystems 202 and the WC subsystems 212 each include at least one sensor 204, 214 that is monitored via operation of the CAM system 300, the monitored subsystems 202 and the WC subsystems 212 are distinguishable from each other in that the WC subsystems 212 each also include at least one controllable device 216 controlled via operation of the CAM system 300, whereas the monitored subsystems 202 do not include devices that are controlled via operation of the CAM system 300.

The communication interface 218 facilitates communication between the controllable devices 216 and the CAM system 300 via the local network 302. The communication interface 218 may also facilitate communication between the sensors 214 and the CAM system 300 via the local network 302, although communication between the sensors 214 and the CAM system 300 may be directly via the local network 302. The communication interface 218 may be, comprise, or be implemented by various types of standard interfaces, such as an Ethernet interface, a universal serial bus (USB), a third generation input/output (3GIO) interface, a wireless interface, and/or a cellular interface, among other examples, although non-standard interfaces may also be utilized. The communication interface 218 may also comprise a communication device, such as a modem or network interface card, to facilitate exchange of data via the local network 302. One or more portions of the communication interface 218 may also be or comprise one or more of the input/output (I/O) modules described below.

The additive system 100 may also comprise one or more HMI/network-controllable (HNC) subsystems 220. Each HNC subsystem 220 comprises one or more sensors 222 each operable to monitor one or more parameters associated with that HNC subsystem 220. For example, each sensor 222 may be operable to generate a signal or information related to operational parameters of one or more controllable devices 224 and/or other components or aspects of the HNC subsystem 220, which may then be communicated to the CAM system 300 directly via the local network 302 or indirectly via a communication interface 226. The communication interface 226 may have the same or similar structure and/or function as the communication interface 218 described above. The signal or information generated by each sensor 222 may also be communicated to a subsystem HMI 228.

The subsystem HMI 228 may permit a human operator to monitor and/or enter control commands or other information operable to control the operation of the controllable devices 224 and/or other portions of the HNC subsystem 220. The subsystem HMI 228 may comprise one or more input devices, one or more output devices, and one or more communication interfaces, as described below. The subsystem HMI 228 may also communicate with the communication interface 226.

Examples of the HNC subsystem 220 depicted in FIG. 2 may include the mixers 108, 128, the pump assemblies 150, and/or other components and/or subsystems of the additive system 100 shown in FIG. 1 that may be monitored via operation of the CAM system 300, that have one or more controllable devices 224 that may be controlled via operation of the CAM system 300, and that include a subsystem HMI 228. Thus, while the WC subsystems 212 and the HNC subsystems 220 each include at least one sensor 214, 222 monitored via operation of the CAM system 300, and each include at least one controllable device 216, 224 controlled via operation of the CAM system 300, the WC subsystems 212 and the HNC subsystems 220 are distinguishable from each other in that the HNC subsystems 220 each also include a subsystem HMI 228, whereas the WC subsystems 212 do not include an HMI.

The CAM system 300 includes a system control/monitoring (SCM) device 306 in communication with the monitored subsystems 202, the WC subsystems 212, and the HNC subsystems 220 via the local network 302. The SCM device 306 is operable to receive information generated by the sensors 204, 214, 222 and, based at least in part on such information, generate and send control signals to the controllable devices 216, 224. For example, the SCM device 306 may be operable to utilize the information generated by the sensors 204, 214, 222 and other data and execute coded machine-readable instructions to implement at least a portion of one or more of the example methods and/or processes described herein, and/or to implement a portion of one or more of the example systems described herein.

The SCM device 306 comprises a communication interface 308 and/or other means operable to facilitate communication between the SCM device 306 and the one or more subsystems 202, 212, 220 of the additive system 200 via the local network 302. The communication interface 308 may have the same or similar structure and/or function as the communication interface 218 described above.

The SCM device 306 may further comprise a system HMI 310 permitting a human operator to monitor and/or enter control commands or other information operable to control the operation of one or more of the subsystems 202, 212, 220 of the additive system 200 via the local network 302. The system HMI 310 may comprise one or more input devices, one or more output devices, and one or more communication interfaces, as described below. Communication between the system HMI 310 and the additive system 200 may be via the communication interface 308 and the local network 302.

The control and monitoring system 300 may further comprise a remote access device 312 operable for communication with the additive system 200 from a remote location not at the wellsite. For example, the remote access device 312 may be located at a substantial distance from the wellsite, and may therefore communicate with the local network 302 via an external network 304. Thus, the remote access device 312 may be operable to communicate with and/or control the operation of one or more portions of the subsystems 202, 212, 220 via the external network 304 and the local network 302.

The external network 304 may be or comprise DSL, telephone, cellular, satellite, and/or other types of networks. At least a portion of the external network 304 is implemented remote from the wellsite, and includes network nodes or other components that are located remote from the wellsite. The external network 304 may form a portion of the CAM system 300 and/or otherwise facilitate communication with the local network 302 and, thus, communication between the remote access device 312 and one or more components of the CAM system 300 and/or one or more components of the additive system 200.

The remote access device 312 may be operable to receive information generated by the sensors 204, 214, 222 and, based at least in part on such information and/or information input by a human operator via a remote HMI 316, generate and send control signals to the controllable devices 216, 224 via the external network 304 and the local network 302. For example, based on the received information, the user input, and/or other data, the remote access device 312 may execute coded machine-readable instructions to implement at least a portion of one or more of the example methods and/or processes described herein, and/or to implement a portion of one or more of the example systems described herein. The remote access device 312 may also be operable to access or otherwise communicate with the SCM device 306, such as to enter control commands or other information operable to control the operation of one or more of the subsystems 202, 212, 220 of the additive system 200.

The remote access device 312 may comprise a communication interface 314 operable to facilitate communication between the remote access device 312 and the external network 304. The communication interface 314 may have the same or similar structure and/or function as the communication interface 218 described above.

The remote HMI 316 may permit a human operator to monitor and/or enter control commands or other information operable to control the operation of one or more of the subsystems 202, 212, 220 of the additive system 200. The remote HMI 316 may comprise one or more input devices, one or more output devices, and one or more communication interfaces, as described below.

Figure 3:
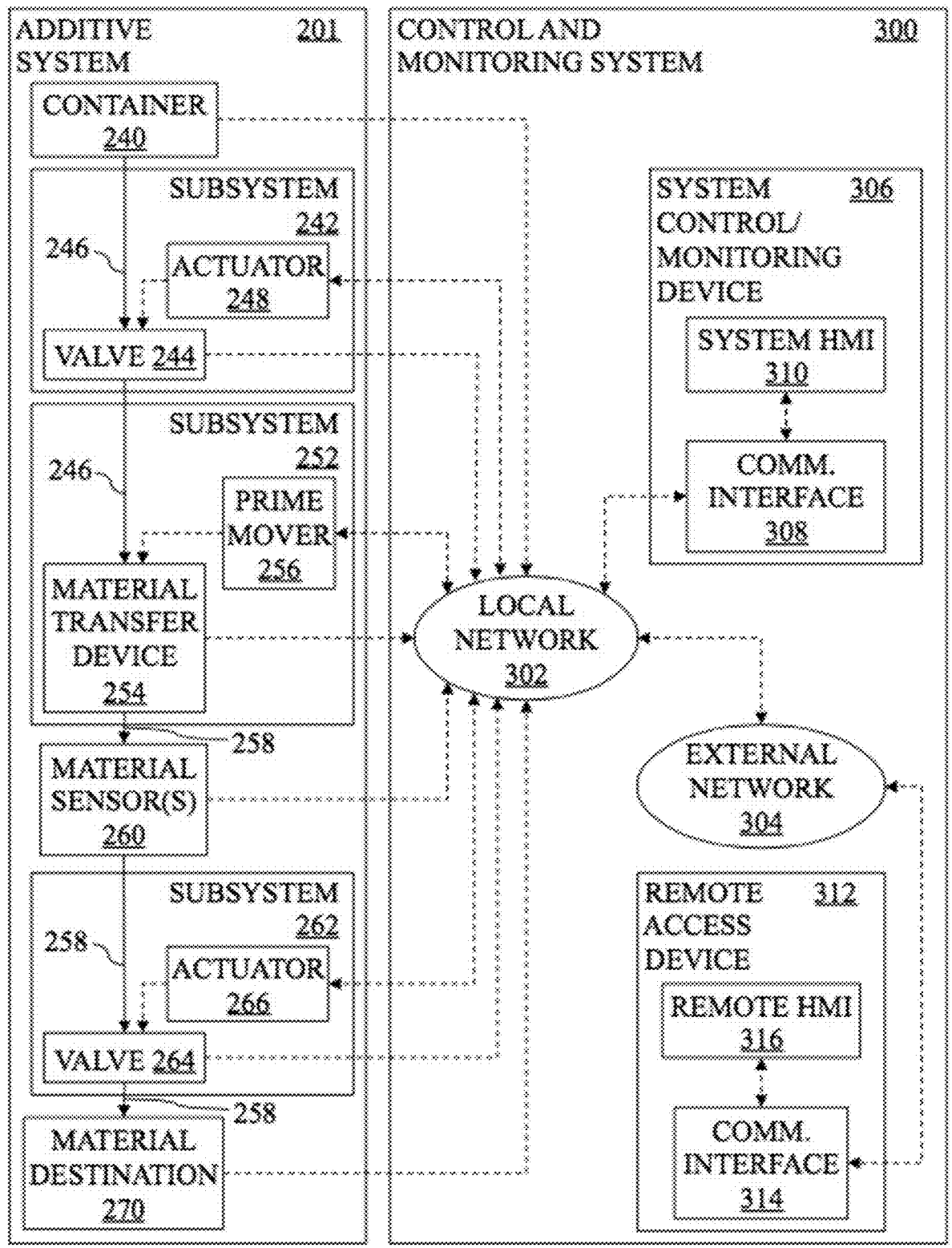
FIG. 3 is a schematic view of at least a portion of an apparatus according to one or more aspects of the present disclosure.

FIG. 3 is a schematic view of at least a portion of an example implementation of an additive system 201 according to one or more aspects of the present disclosure. The additive system 201 shown in FIG. 3 provides an example of the generic additive system 200 shown in FIG. 2 when implemented in the environment of the additive system 100 shown in FIG. 1. That is, the additive system 201 shown in FIG. 3 comprises components of the additive system 100 shown in FIG. 1 implemented as the various subsystems 202, 212, 220 of the additive system 200 shown in FIG. 2.

However, a person having ordinary skill in the art will readily appreciate that other implementations of the generic additive system 200 shown in FIG. 2, including in environments other than the example additive system 100 shown in FIG. 1, are also within the scope of the present disclosure.

The following description refers to FIGS. 1-3, collectively.

The additive system 201 may comprise a container 240, such as may be or comprise one or more of the containers 110, 112, 130, 140 shown in FIG. 1. The container 240 may be an implementation of the monitored subsystem 202, and may thus comprise one or more sensors 204, such as material quantity sensors operable to generate information related to level, volume, and/or mass of the material within the container 240 and/or the output transfer rate of material from the container 240. The material quantity sensors may comprise conductive, capacitive, vibrating, electromechanical, ultrasonic, microwave, nucleonic, and/or other material height or level detection means, which may be further utilized to calculate material volume. The material quantity sensors may further comprise mass measuring means, such as load cells, pressure sensors, and/or other weight measuring means. The material within the container 240 may be transferred or otherwise communicated through a plurality of subsystems of the additive system 201 until the material is injected or discharged into a material destination 270, as described below.

For example, another subsystem 242 of the additive system 201 may comprise a valve 244 operable to control the transfer of the material from the container 240 to a subsequent subsystem 252 via one or more material conduits 246. The valve 244 may be disposed with or near the container 240, or further downstream from the container 240 along the conduit(s) 246, and may be or comprise a check valve, a flow control valve, a directional control valve, a diverter valve, a shut-off valve, a ball valve, a butterfly valve, a gate valve, a globe valve, and/or other types of valves. The valve 244 may be actuated or otherwise moved between valve positions by an actuator 248, which may be or comprise a manual operator (such as a handle or lever), a pneumatic or hydraulic actuator (such as a cylinder), an electric motor, or a solenoid, among other examples.

The subsystem 242 may be an implementation of an instance of the WC subsystem 212 or the HNC subsystem 220, such that the valve 244 and/or the actuator 248 may be implementations of the controllable devices 216, 224. Accordingly, the sensors 214, 222 may be disposed or otherwise utilized in association with the valve 244 and/or the actuator 248, such as for generating information related to operational parameters of the valve 244 and/or the actuator 248. For example, the one or more sensors 214, 222 may be operable to generate information related to temperature, pressure, electrical current, power consumption, proximity, linear position, rotational position, operating speed, operating frequency, torque, elapsed operating time, and/or other operational parameters associated with the valve 244, the actuator 248, and/or other monitored and/or controlled components of the subsystem 242. The information generated by the sensors 214, 222 may then be communicated to the CAM system 300 via the local network 302, as described above. When the subsystem 242 is implemented as an instance of the HNC subsystem 220, the information generated by the sensors 222 in association with the valve 244, the actuator 248, and/or other components of the subsystem 242 may also be communicated to the subsystem HMI 228 for review and/or action thereon by a human operator at the subsystem 242, as described above.

The example subsystem 252 that may receive the material transferred from the container 240 via the subsystem 242 may comprise a material transfer device 254 operable to receive and transfer the material from the first subsystem 242 to another subsystem 262, such as via one or more material conveyors and/or other conduits 258. The material transfer device 254 may be or comprise one of the material transfer devices 114, 116, 131 or pumps 152 shown in FIG. 1. Thus, the subsystem 252 may also comprise a prime mover 256 operable to drive the material transfer device 254. The prime mover 254 may be or comprise a corresponding one of the prime movers 115, 117, 132, 154 shown in FIG. 1. The subsystem 252 may also comprise a prime mover control device (not shown), such as may power and/or control the prime mover 256. For example, in implementations in which the prime mover 256 comprises an electric motor, the prime mover control device may be a drive, and in implementations in which the prime mover 256 comprises an engine, the prime mover control device may be a throttle device.

The subsystem 252 may be an implementation of an instance of the WC subsystem 212 or the HNC subsystem 220, such that the material transfer device 254 and/or the prime mover 256 may be implementations of the controllable devices 216, 224. Accordingly, the sensors 214, 222 may be disposed or otherwise utilized in association with the material transfer device 254 and/or the prime mover 256, such as for generating information related to operational parameters of the material transfer device 254 and/or the prime mover 256. For example, the one or more sensors 214, 222 may be operable to generate information related to temperature, pressure, electrical current, power consumption, proximity, linear position, rotational position, operating speed, operating frequency, torque, elapsed operating time, and/or other operational parameter associated with the material transfer device 254, the prime mover 256, and/or other monitored and/or controlled components of the subsystem 252. The information generated by the sensors 214, 222 may then be communicated to the CAM system 300 via the local network 302, as described above. When the subsystem 252 is implemented as an instance of the HNC subsystem 220, the information generated by the sensors 222 in association with the material transfer device 254, the prime mover 256, and/or other components of the subsystem 252 may also be communicated to the subsystem HMI 228 for review and/or action thereon by a human operator at the subsystem 252, as described above.

The additive system 201 may also comprise one or more material sensors 260 operable to generate information related to properties of the material communicated via the one or more material conduits 246, 258. Each material sensor 260 may be an implementation of the monitored subsystem 202. Thus, each material sensor 260 may be or comprise the one or more sensors 204 operable to generate information related to one or more parameters associated with the material transferred via the one or more material conduits 246, 258. The information generated by the material sensor(s) 260 may then be communicated to the CAM system 300 via the local network 302, as described above.

Each material sensor 260 may be located along one or more of the material conduits 246, 258. For example, one or more material sensors 260 may be located downstream (i.e., on the outlet or pressure side) and/or upstream (i.e., on the inlet or suction side) of the material transfer device 254, among other possible locations within the additive system 201. For example, at least one of the material sensors 260 may be or comprise a flow meter operable to generate information relate to the flow rate of material being transferred via the one or more material conduits 246, 258. If the material being transferred comprises a fluid, the corresponding material sensor(s) 260 may be or comprise a fluid flow meter operable to measure the volumetric and/or mass flow rate of the fluidic material. If the material comprises a solid or particulate material, the corresponding material sensor(s) 260 may be or comprise a dry or particulate flow meter operable to measure the volumetric and/or mass flow rate of the dry or particulate material. One or more of the material sensors 260 may also or instead be or comprise a mechanical flow meter, such as gear or turbine meter, a pressure-based meter (such as a Venturi or pitot-static tube meter), an optical flow meter, a mass flow meter, and/or other types of flow meters operable to measure rate of movement of a liquid or solid material.

One or more of the material sensors 260 may also or instead be operable to generate other information related to properties of the material transferred via the one or more conduits 246, 258. For example, such material sensors 260 may be operable to generate information related to temperature, pressure, viscosity, density, composition, and/or other physical parameters of the material being transferred.

The example implementation of the additive system 201 shown in FIG. 3 also includes another instance of the subsystem 242, designated in FIG. 3 by the reference numeral 262. The subsystem 262 comprises a valve 264 operable for controlling the transfer of material from the subsystem 252 to the material destination 270 via one or more of the material conduits 258. As above, the valve 264 may be actuated or otherwise moved between valve positions by an actuator 266. The valve 264 and actuator 266 may be as described above with respect to the valve 244 and the actuator 248 of the subsystem 242.

As also described above, the subsystem 262 may be an implementation of the WC subsystem 212 or the HNC subsystem 220, such that the valve 264 and/or the actuator 266 are implementations of the controllable devices 216, 224. Accordingly, the sensors 214, 222 may be disposed or otherwise utilized in association with the valve 264 and/or the actuator 266, such as may be operable to generate information related to operational parameters of the valve 264 and/or the actuator 266. For example, the one or more sensors 214, 222 may be operable to generate information related to temperature, pressure, electrical current, power consumption, proximity, linear position, rotational position, operating speed, operating frequency, torque, elapsed operating time, and/or other operational parameters associated with the valve 264 and/or the actuator 266. The information generated by the sensors 214, 222 may then be communicated to the CAM system 300 via the local network 302, as described above. Where the subsystem 262 is an implementation of the HNC subsystem 220, the information generated by the sensors 222 in association with the valve 264 and/or the actuator 266 may also be communicated to the subsystem HMI 228, as described above.

The subsystem 262 may discharge the material into the material destination 270. The material destination 270 may be or comprise the first or second mixing device 108, 128. The material destination 270 may instead be the fourth container 140 in implementations in which the material transfer device 254 is or comprises one of the material transfer devices 114, 116, 131. The material destination 270 may also or instead be or comprise the common manifold 142 in implementations in which the material transfer device 254 is or comprises the pump 152.

The material destination 270 may be in communication with the CAM system 300. For example, each mixing device 108, 128 may comprise one or more motors and other actuators (not shown) operable to receive control signals from the CAM system 300 to control or otherwise operate each mixing device 108, 128. Each mixing device 108, 128 may also comprise one or more sensors (not shown) operable to generate a signal or information related to operational parameters of each mixing device 108, 128 and communicate such signal or information to the CAM system 300. Likewise, the common manifold 142 may comprise one or more actuators (not shown) operable to receive control signals from the CAM system 300, such as to control or otherwise operate flow through the common manifold 142. The common manifold 142 may also comprise one or more sensors (not shown) operable to generate a signal or information related to operational parameters of or associated with the common manifold 142 and communicate such signal or information to the CAM system 300.

Figure 4:
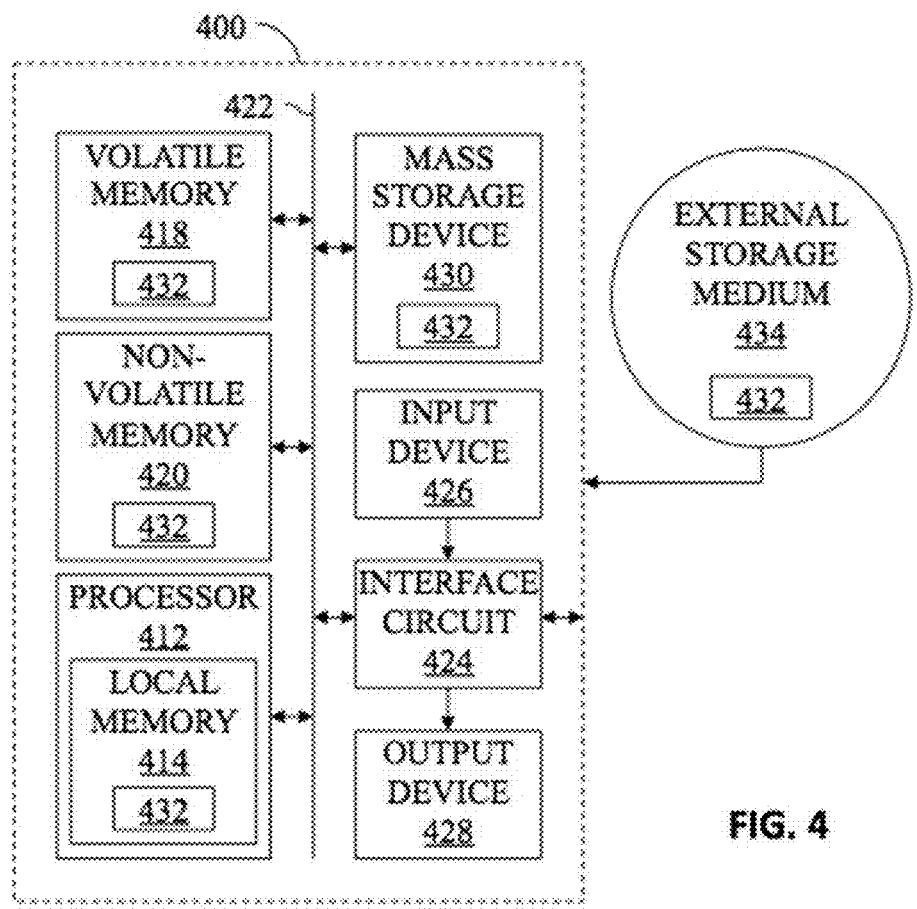
FIG. 4 is a schematic view of at least a portion of an apparatus according to one or more aspects of the present disclosure.

Various portions of the additive systems 100, 200, 201 and/or the CAM system 300 may comprise various control hardware. For example, the control hardware may be implemented as cards, modules, circuits, and/or other devices forming at least portions of the subsystems 202, 212, 220 of the additive system 200 and the control devices 306, 312 of the CAM system 300. FIG. 4 is a schematic view of at least a portion of an example implementation of such control hardware 400 according to one or more aspects of the present disclosure.

In the example implementation shown in FIG. 2, components of the local network 302, components of the external network 304, components of each subsystem 202, 212, 220 of the additive system 200 (such as each of the HMIs 228 and the communication interfaces 218, 226), components of the SCM device 306 (such as each of the HMI 310 and the communication interface 308), and components of the remote access device 312 (such as each of the remote HMI 316 and the communication interface 314) may each be implemented as an instance of the control hardware 400 shown in FIG. 4, or a subset of the various components of the control hardware 400 described below. Thus, for example, various instances of the control hardware 400 may be operable to facilitate communication between the additive system 200 and the CAM system 300, including communication between one or more components of various instances of the subsystems 202, 212, 220 and the SCM device 306 via the local network 302, and communication between one or more components of various instances of the subsystems 202, 212, 220 and the remote access device 312 via the local network 302 and the external network 304.

Each instance of the control hardware 400 may be or comprise one or more processors, special-purpose computing devices, servers, personal computers, personal digital assistant (PDA) devices, smartphones, Internet appliances, and/or other types of computing devices. As depicted in FIG. 4, the various instances of the control hardware 400 may each include one or more instances of each of a processor 412, a volatile memory 418, a non-volatile memory 420, an interface circuit 424, an input device 426, an output device 428, and/or a mass storage device 430, and may include or be operable or otherwise associated with an external storage medium 434. However, each instance of the control hardware 400 that is implemented as or within the various components of the additive system 200 and the CAM system 300 may not include each of the components depicted in FIG. 4, but may instead include a subset of the depicted components.

For example, an instance of the control hardware 400 that is implemented as or within the SCM device 306 may include each of the components depicted in FIG. 4 (although perhaps without the external storage medium 434), whereas instances of the control hardware 400 that are implemented as or within instances of the remote access device 312 and/or the HNC subsystem 220 may not include the mass storage device 430 and/or the external storage medium 434. As another example, instances of the control hardware 400 that are implemented as or within instances of the WC subsystem 212 may not include the mass storage device 430, the external storage medium 434, the input device 426, and/or the output device 428. In another example, instances of the control hardware 400 that are implemented as or within instances of the monitored subsystem 202 may not include the mass storage device 430, the external storage medium 434, the input device 426, the output device 428, and/or the interface circuit 424. However, the monitored subsystem 202 may not be implemented utilizing an instance of the control hardware, but may instead be implemented utilizing components other than those depicted in FIG. 4, such as components conventionally utilized in mesh, radio-frequency identification (RFID), and/or other sensor networks, including those utilizing PROFIBUS, Modbus, Highway Addressable Remote Transducer (HART), Fieldbus, and/or other industrial standard communication protocols.

Moreover, the above-described examples of the different subsets of the components depicted in FIG. 4 that may form the various instances of the control hardware 400 are indeed merely examples, and other examples of different subsets of the components depicted in FIG. 4 that may be included in the various instances of the control hardware 400 for implementing the various components of the additive system 200 and the CAM system 300 are also within the scope of the present disclosure. Nonetheless, it should be understood that reference hereafter to an instance of the control hardware 400 contemplates instances including each of the components depicted in FIG. 4 as well as instances including a subset of the depicted components.

Each instance of the control hardware 400 may be operable to execute coded machine-readable instructions to implement at least a portion of one or more of the example methods and/or processes described herein, and/or to implement a portion of one or more of the example systems described herein. For example, various instances of the control hardware 400 may receive information generated by the sensors 204, 214, 222, information input by a human operator via one or more of the HMIs 228, 310, 316, and/or information retrieved from internal or external memory of that instance of the control hardware 400, among other possible information sources. Each instance of the control hardware 400 may execute programs, routines, and/or other coded instructions based on such information, perhaps resulting in the generation of output information. For example, the executed instructions and/or generated output information may be for controlling the controllable devices 216, 224, and/or for monitoring the sensors 204, 214, 222 and/or other operational aspects of the additive system 200, whether by another instance of the control hardware 400 and/or a human operator utilizing one or more of the HMIs 228, 310, 316.

The processor 412 may be a general-purpose programmable processor, among other examples. The processor 412 may comprise a local memory 414, and may execute programs or coded instructions 432 present in the local memory 414 and/or another memory device. The processor 412 may execute, among other things, machine-readable instructions or programs to implement the methods and/or processes described herein.

The coded instructions 432 stored in the local memory 414 may include program instructions or computer program code that, when executed by an associated processor, facilitate the controllable devices 216, 224, or the additive system 200 as a whole, to perform at least portions of the methods and/or processes described herein. The coded instructions 432 stored in the local memory 414 may further include program instructions or computer program code that, when executed by the processor 412, facilitate one or more instances of the control hardware 400 to record the information generated by the sensors 204, 214, 222, such as for determining efficiency, accuracy, and/or other operational aspects of one or more components of the additive system 200 based, for example, on the information generated by the sensors 204, 214, 222. For example, the coded instructions 432 stored in the local memory 414 may also include program instructions or computer program code that, when executed by the processor 412, facilitate one or more instances of the control hardware 400 to determine remaining functional life of one or more components of the additive system 200, determine remaining operational time until failure of one or more components of the additive system 200, and/or determine health of one or more components of the additive system 200 based on the information generated by the sensors 204, 214, 222.

The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, among other examples. However, other processors from other families are also appropriate.

The processor 412 may be in communication with a main memory, such as may include the volatile memory 418 and/or the non-volatile memory 420, perhaps via a bus 422 and/or other communication means. The volatile memory 418 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by read-only memory, flash memory, and/or other types of memory devices. One or more memory controllers (not shown) may control access to the volatile memory 418 and/or the non-volatile memory 420. One or more instances of the control hardware 400 may be operable to store or record the signals or other information generated by the sensors 204, 214, 222 on the main memory.

The communication interface 424 may have the same or similar structure and/or function as the communication interface 218 described above. The communication interface 424 may facilitate communication between the control hardware 400 instance and other portions of the additive system 200 and/or the CAM system 300. One or more portions of the communication interface 424 may be or comprise one or more of the I/O modules described below.

The input device 426 may also be connected to the communication interface 424. The input device 426 may permit a human operator to enter data and commands into the processor 412. The input device 426 may be, comprise, or be implemented by a keyboard, a mouse, a touchscreen, a track-pad, a trackball, an isopoint, and/or a voice recognition system, among other examples.

The output device 428 may also be connected to the communication interface 424. The output device 428 may permit a human operator to visually, audibly, or otherwise perceive information generated by the control hardware 400 instance, such as the information received from the sensors 204, 214, 222. The output device 428 may be, comprise, or be implemented by a display device (e.g., a light-emitting diode (LED) display, a liquid crystal display (LCD), and/or cathode ray tube (CRT) display, among others), a printer, and/or speakers, among other examples.

The mass storage device 430 may store the coded instructions 432 and/or other data. Examples of such mass storage devices 430 include floppy disk drives, hard drive disks, compact disk (CD) drives, digital versatile disk (DVD) drives, and flash drives, among other examples. The coded instructions 432 may be stored in the mass storage device 430, the volatile memory 418, the non-volatile memory 420, the local memory 414, and/or the removable or external storage medium 434. The external storage medium 434 may be or comprise a hard drive disk, CD, DVD, and/or flash drive, among other examples.

At least portions or components of various instances of the control hardware 400 may be implemented in one or more integrated circuit chips (e.g., an application specific integrated circuit, or ASIC), such as may be mounted to a printed circuit board, a removable plug-in card, or other electronics device. However, at least portions or components of various instances of the control hardware 400 may instead be implemented as software or firmware for execution by one or more processors. Such implementations may be provided as a computer program product including a computer readable medium or storage structure embodying computer program code (i.e., software or firmware) thereon for execution by the processor 412.

The coded instructions 432 of the SCM device 306 and/or other portion of the CAM system 300 may include instructions or program code for implementing several layers of diagnostic tools operable to perform diagnostics of the additive system 200 and/or the CAM system 300. For example, the diagnostic tools may facilitate monitoring various properties and/or parameters associated with the health of one or more components or other portions of the additive system 200 and/or the CAM system 300. The diagnostic tools may also cause various instances of the control hardware 400 to generate output signals or information indicative of the health of one or more components or other portions of the additive system 200 and/or the CAM system 300. For example, one or more instances of the control hardware 400 may initiate outputs perceivable to human operators, such as may include alarms, visual indicators, error codes, and/or other diagnostic information to be perceived by human operators via one or more of the output devices 428 of one or more of the HMIs 228, 310, 316.

Figure 5:
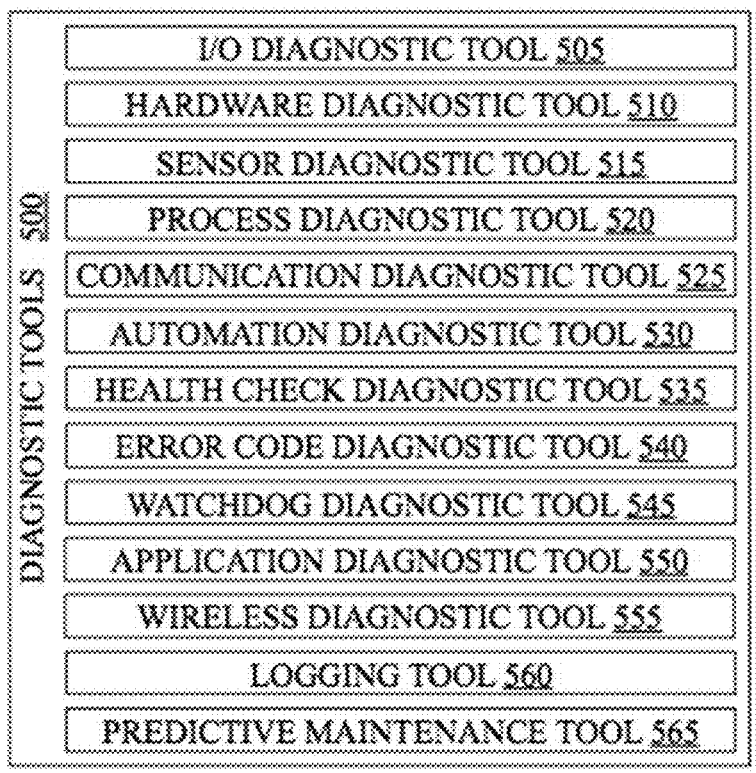
FIG. 5 is a block diagram of diagnostic tools according to one or more aspects of the present disclosure.

Possible human operators may include electronic technicians (ET), field supervisors, software engineers, control engineers, reliability engineers, EPA representatives, mechanics, researchers, and field service managers, among other examples. Each group of human operators may be interested in different information related to the additive system 200 and/or the CAM system 300. Thus, the diagnostic tools may be divided into several levels, each operable to address different classes of problems associated with different portions or components of the additive system 200 and/or the CAM system 300. FIG. 5 is a block diagram of at least a portion of an example implementation of the diagnostic tools 500 according to one or more aspects of the present disclosure. The following description refers to FIGS. 1-5, collectively.

The diagnostic tools 500 include an I/O diagnostic tool 505, a hardware level tool 510, a sensor diagnostic tool 515, a process diagnostic tool 520, a communication diagnostic tool 525, an automation diagnostic tool 530, a health check diagnostic tool 535, an error code diagnostic tool 540, a watchdog diagnostic tool 545, an application diagnostic tool 550, a wireless diagnostic tool 555, a logging tool 560, and a predictive maintenance tool 565. However, other implementations of the diagnostic tools 500 are also within the scope of the present disclosure, including implementations that do not include one or more of the diagnostic tools 500 depicted in FIG. 5, as well as implementations that include diagnostic tools other than those depicted in FIG. 5.

The I/O diagnostic tool 505 performs I/O level diagnostics, such as for monitoring I/O cards, modules, and/or other I/O hardware (such hardware hereafter collectively referred to as "modules") of the communication interfaces 218, 226, 308, 314, 424 and/or other I/O devices. The I/O diagnostic tool 505 is operable to detect defects and/or error conditions in the communication interfaces 218, 226, 308, 314, 424. Information generated by the I/O diagnostic tool 505, such as input/output states, faults, warnings, and/or errors, may be visually or otherwise perceivable by human operators via the HMI 310, and/or may be logged or otherwise recorded to internal or external memory, including as described below with regard to the logging tool 560.

The I/O diagnostic tool 505 may perform diagnostics for analog input modules to indicate configuration errors, missing external load voltage errors, reference voltage errors, common-mode errors, overvoltage warnings, open circuit detections, short-circuit detections, and/or exceeded upper/lower limit detections, among other examples. The I/O diagnostic tool 505 may also perform diagnostics for analog output modules to indicate configuration errors, missing external load voltage errors, open circuit detections, short-circuit detections, and/or exceeded load voltage upper/lower limit detections, among other examples.

The I/O diagnostic tool 505 may also perform diagnostics for digital input modules to indicate input states, ground fault detections, missing sensor supply detections, blown fuse detections, short-circuit detections, and/or overvoltage detections, among other examples. The I/O diagnostic tool 505 may also perform diagnostics for digital output modules to indicate output states, missing load voltage errors, blown fuse detections, short-circuit detections, overvoltage detections, ground fault detections, and/or over-temperature detections, among other examples.

The I/O diagnostic tool 505 may also perform diagnostics for thermocouple input modules to indicate configuration errors, exceeded upper/lower limit detections, and/or open circuit detections, among other examples. The I/O diagnostic tool 505 may also perform diagnostics for frequency input modules to indicate configuration errors, exceeded upper/lower limit detections, open circuit detections, and/or faulty encoder power supply detections, among other examples.

The I/O diagnostic tool 505 for digital input and output modules may generate diagnostic messages related to faults or errors and display them via the HMI 310. Examples of diagnostic messages identifying a problem with a digital input module may include messages indicating that an external load voltage is missing, and/or messages indicating the existence of a configuration error, a programming error, a common-mode error, a wire break, an underflow, and/or an overflow. Example diagnostic messages identifying possible causes for the problem with an input module may include messages indicating a potential difference between inputs of the module and a reference potential of a measuring circuit, and/or messages indicating that a load voltage of the module is missing, faulty parameters were transferred to the module, the resistance of a transducer circuit is too high, an open circuit exists between the module and a sensor, a channel is not connected (open), an input value is below a predetermined range, a measuring range setting is wrong, a sensor polarity is reversed, and/or an input value exceeds an overshoot range. Example diagnostic messages identifying possible solutions to a problem with an input module may include messages recommending connecting a corresponding supply, checking a measuring range of the module, programming the module, using a different type of sensor, connecting a cable, disabling a channel group, wiring a channel, programming a different measuring range, checking connectors, and/or programming a different measuring range.

Examples of diagnostic messages identifying a problem with an output module may include messages indicating that an external load voltage is missing, and/or messages indicating the existence of a configuration error, a programming error, a short circuit, and/or a wire break. Example diagnostic messages identifying possible causes for a problem with an output module may include messages indicating that a load voltage of the module is missing, faulty parameters were transferred to the module, an overload exists at an output, a short circuit exists at an output, an actuator impedance is too high, a wire break exists between the module and an actuator, and/or a channel is not being used. Example diagnostic messages identifying possible solutions to a problem with an output module may include messages recommending connecting a supply, assigning new module parameters, eliminating an overload, eliminating a short circuit, using a different type of actuator, modifying the corresponding wiring, connecting a cable, and/or disabling a channel group.

The hardware diagnostic tool 510 performs hardware diagnostics, such as for monitoring various hardware components to diagnose usage issues, configure problems, and/or detect hardware failures. Examples of hardware diagnostics include monitoring processor usage, stack usage, memory usage, IP address, firmware version, unit type, card level faults, over-temperature events, RAM faults, EEPROM faults, and lost hardware interrupts.

One or more instances of the control hardware 400 may include a self-test mechanism operable to run a self-diagnostic operation between jobs, such as may permit a human operator to perform troubleshooting of hardware problems. The self-test mechanism may be accessible via one or more of the HMIs 228, 310, 316. As described above, one or more instances of the control hardware 400 may be operable to provide an external network connection via the external network 304, thus permitting remote access to hardware diagnostics performed by the hardware diagnostic tool 510. However, the bandwidth sufficient to perform such diagnostic operations may be limited during wellsite operations. Thus, such remote access to diagnostic data may be coordinated in a controlled manner. For example, remote access to the hardware diagnostics performed by the hardware diagnostic tool 510 may be limited to periods during which wellsite operations are not being performed. The hardware diagnostics data may, however, be communicated directly (i.e., not through the external network 304) to one or more instances of the control hardware 400 and/or the HMIs 228, 310 at the wellsite, such as may permit access to relevant data, and/or to control the communication mechanism utilized to acquire the hardware diagnostics data, during wellsite operations.

It is also noted that the capabilities and compatibility of various instances of the control hardware 400 may be tied to the corresponding firmware and/or software versions. Thus, such versions may also be displayed via the HMI 310. Such version information may also permit automatic update of the firmware and/or software, as well as confirmation of compatibility between instances of the control hardware 400 and functionality of the HMIs 228, 310, 316.

Issues may also occur when human operators input information related to hardware type or configuration. Thus, such information may be provided automatically in that the hardware may identify itself via a "type" parameter. The type parameter information may be displayed for various instances of the control hardware 400 via the HMI 310, such as may provide configuration feedback and/or facilitate automatic detection. Additionally, if the hardware type is known, further diagnostics may be implemented, such as matching of I/O modules to hardware type, or verifying that proper hardware types are implemented for certain jobs. If unrecognized hardware types or responsiveness issues are detected, such issues may be also indicated via the HMI 310.

The hardware diagnostics may be implemented, for example, when an electronic technician (ET) replaces an I/O module due to a failure, when the ET mistakenly installs the wrong I/O module type and operates the additive system 200, when the CAM system 300 compares the installed I/O module types to the known configurations, and/or when the hardware diagnostic tool 510 generates an error message indicating that a problem exists. The hardware diagnostics may also address situations in which an instance of the control hardware 400 has the wrong hardware type set due to improper configuration by a human operator, when a human operator failed to set the hardware type, when there is a mechanical failure (such as when cables disconnect from an input module), or when an output to a solenoid or relay is short-circuited, among other examples.

External power supplies with status contacts that indicate when a fault has occurred may also be utilized to provide power to digital outputs. Thus, the hardware diagnostics may monitor the status contacts and, when fault condition occurs, generate an error message indicating a power supply fault exists.

The hardware diagnostics information displayed via the HMI 310 may include firmware version, processor usage, stack usage, memory usage, IP address, unit type, disk usage, hardware level faults, warnings, errors, power supply status, proper card configuration test results for hardware type, and/or hardware type information. While this information is monitored, an alarm may be generated when an output signal is outside a selected threshold, or when a hardware level fault, warning, and/or error is detected. This information may also be logged or otherwise recorded to internal or external memory, including as described below with respect to the logging tool 560.

The sensor diagnostic tool 515 performs sensor diagnostics for monitoring the sensors 204, 214, 222. The sensor diagnostic information may also be logged or otherwise recorded to internal and/or external memory, including as described below with respect to the logging tool 560.

The sensor diagnostics may include confirming that the sensors 204, 214, 222 are set to an intended range and/or do not have excessive zero shift. The range checking may be performed in conjunction with the I/O diagnostic tool 505 with proper selection of hardware. The zero shift checking may be utilized to notify human operators that the sensors 204, 214, 222 are being utilized in a condition that is out of specification. One or more of the sensors 204, 214, 22 may also be a smart sensor that is able to generate information related to its health and communicate such information to one or more of the HMIs 228, 310, 316.

Examples of sensor diagnostics include monitoring discharge pressure sensors on fracturing pumps and cement units to detect excessive zero drift. Upon such detection, the sensor diagnostic tool 515 may then issue a warning message, via the HMI 310, indicating which pressure sensor is out of specification. Sensor diagnostics may also include monitoring a fracturing pump suction pressure sensor, such as to compare an amperage or other parameter associated with the sensor to a predetermined threshold to verify that the sensor is present and functioning and issue a warning message that the sensor is defective or not present if the parameter fails to meet the predetermined threshold.

The process diagnostic tool 520 performs process diagnostics for monitoring raw sensor data and/or other process parameters values to, for example, confirm that such values meet predetermined thresholds or are within predetermined ranges. Such information may be displayed via one or more of the HMIs 228, 310, 316, such as may facilitate identification of problems associated with the wellsite operation process. The process diagnostic tool 520 may also permit configuration of thresholds for alarms, whether preprogrammed or via the HMI 310, such that changes in the sensors 204, 214, 222, variations in components of the additive system 200, and changes in process knowledge may be easily incorporated. Such alarms may be enhanced by adding a troubleshooting guide or a list of suggestions related to potential root causes of each alarm. One example of process diagnostics includes comparing the power end oil pressure on a pump 152 to a threshold value while the associated prime mover 154 is driving the pump 152. For example, if the pressure falls below the threshold value, the process diagnostic tool 520 may issue a low power end oil pressure warning, via the HMI 310. Other examples of process diagnostics may include comparing an air pressure of the pump 152 to a threshold value. For example, if the air pressure falls below the threshold value, the process diagnostic tool 520 may issue a low air pressure warning and display a list of potential resolutions, such as checking the air supply, compressor, filter, or hoses (e.g., for leaks) of the pump 152. The process diagnostic information may also be logged or otherwise recorded to internal and/or external memory, including as described below with respect to the logging tool 560.

The communication diagnostic tool 525 performs communication diagnostics for monitoring communication between the sensors 204, 214, 222, various instances of the control hardware 400, other components of the additive system 200 and the CAM system 300, the local network 302, and perhaps the external network 304. Information related to the communication diagnostics, such as response times to polling requests and warnings, errors, and/or faults related to communication loss, may be logged or otherwise recorded to internal and/or external memory, including as described below with respect to the logging tool 560.

Communication diagnostics may include detecting different types of communication failures between such components, because loss of actuation and sensor signals may disable control loops and/or otherwise disable the automated control aspects of the additive system 200 and the CAM system 300. Accordingly, upon detection of different types of communication failures, a human operator may be notified so that manual control may be initiated, and/or an appropriate safe state may be entered. Communication diagnostics may also monitor for loss of communication with external systems, which may compromise control or input data. Communication diagnostics may also include monitoring for errors and/or faults related to Modbus, PROFIBUS, HART, Controller Area Network (CAN), and/or other communication protocols.

Communication diagnostics may include periodically checking for the presence of the I/O module of various components of the additive system 200. If one of the I/O modules is not present, a warning may be issued (via the HMI 310) to indicate that communication with that I/O module has been lost. Communication diagnostics may also utilize a handshake mechanism to transfer and/or synchronize information between the HMIs 228, 310, 316, various I/O modules, and/or other components of the additive system 200, such as to periodically check perform the handshake to verify that communication is present with the corresponding component. If the handshake value has not been updated, a warning may be issued, and the missing component may be set to an offline mode.

For example, each pump 152 may include a master distributed control unit (DCU), a slave DCU, and an I/O module. The master and slave DCUs may each be implemented via an instance of the control hardware 400. The SCM 306 may ordinarily communicate with the master DCU but not the slave DCU. The master DCU may periodically check for the presence of the slave DCU and the I/O module. If either piece of hardware is not present, the master DCU may communicate such occurrence to the SCM 306, such that a warning may be issued via the HMI 310 to indicate that communication has been lost.

The automation diagnostic tool 530 performs automation diagnostics for monitoring automatic operations of the additive system 200 without human operator knowledge or participation. For example, during a tub calibration procedure in cementing operations, the automation diagnostics may monitor a rise in tub level to complete a calibration process. If the tub level rise does not meet certain criteria, the tub level calibration may not complete and a human operator may not be aware of it. Therefore, automation diagnostics may provide status information and the criterion for success related to various automation steps and/or sequences. If an automation sequence is not functioning properly, step information for troubleshooting may be displayed via one or more of the HMIs 228, 310, 316. The automation diagnostics may also include providing a message identifying the reason for an abort of automation or failure, instead of a generic "aborted" or "failed" message. For example, such message may be "aborted due to gate time-out."

Another example of automation diagnostics includes sand blender gate calibration during the course of fracturing operations, such as for an automatic calibration routine to identify parameters to control the gate. During the calibration routine, the gate may open to various degrees while the results are analyzed in real-time, and this process may be repeated until the gate responds as intended. For example, the automation diagnostics may provide diagnostic messages to indicate the current step in the calibration process, such as "gate opening to 10%," and if the calibration fails, the reason for the failure may also be provided.

The automation diagnostics may provide status information indicating what the additive system 200 is doing, awaited actions of the additive system 200 (e.g., the closing of a valve or a material level obtaining a predetermined level), and information related to aborted or failed steps along with the reason for or a description of the abort or failure. This and other information related to automation diagnostics may also be logged or otherwise recorded to internal and/or external memory, including as described below with respect to the logging tool 560.

The health check diagnostic tool 535 performs health check diagnostics for monitoring the relationships between sensors 204, 214, 222. Such relationships, along with knowledge of the process being performed by the additive system 200, may aid in detecting additional problems with the additive system 200, such as problems that are sensor related, mechanical in nature, and/or process related. Health check diagnostics may provide an early warning to a human operator that, although the additive system 200 is functioning, something is wrong with the operation of the additive system 200, and may facilitate identification of the root cause. Relationships of impossible combinations may also be utilized to flag problems, such as feedback indicating that a valve is open and closed at the same time. Information related to the health check diagnostics, such as warnings, errors, and/or faults, may also be logged or otherwise recorded to internal and/or external memory, including as described below with respect to the logging tool 560.

During operation of the additive system 200, health check diagnostics may verify the open or closed status of valves, check redundant sensors against one another within an error tolerance, and check sensors to verify a process condition, among other examples. In an example pertaining to cementing system implementations, a surge can weight, gate position, output flow, and tub level may be related. If the gate is open, there is cement in the surge can, and the flow of cement out of the cementing system is known, then the tub level reaction may be determined. Health check diagnostics may also be utilized with cementing pumps. For example, if a triplex pump is stroking and the valve positions are known, then the rate measurements from proximity switches and a downhole flow meter may be determined. The health check diagnostics may be utilized in determining these and other relationships, and/or identifying related problems with cementing and other implementations of the additive system 200.

The error code diagnostic tool 540 performs error code diagnostics operable to provide a human operator with information related to problems with the additive system 200 by displaying predefined error codes. The I/O modules, transmission control modules (TCMs), engine control modules (ECMs), VFDs, and/or other components of the additive system 200 may generate various error codes that may be communicated to one or more of the HMIs 228, 310, 316, such that the code number and a meaningful message may be displayed to a human operator. Displaying both the error code and the meaning of each error code may facilitate understanding of the problem without accessing a separate manual or interpreting tool. For example, the error code diagnostic tool 540 may monitor various components of the additive system 200 for error codes and, when an error code is detected, the error code number, the type of error, and the number of occurrences may be provided as diagnostic information, perhaps with a textual description of the error code to assist with troubleshooting.

Error code diagnostics may also include firmware diagnostics. If an instance of the control hardware 400 does not include an output device 428, control related errors (e.g., divide by zero, default case statement, default else statement, logic error condition) may not be communicated to a human operator. Without knowledge of the errors, control related problems may be difficult to diagnose. Therefore, firmware errors may be stored in variables, which may be manually read. The errors may be captured and presented to a human operator via one or more of the HMIs 228, 310, 316. For example, the error numbers and messages may be transmitted as a predefined string and an unsigned integer. A human operator may then utilize the error numbers and messages to diagnose the corresponding component of the additive system 200 and correct the problem that led to the error code being generated. A real-time operating system may also provide errors and/or warnings related to tasks that run too long and/or that a scheduling problem exists.

The error code diagnostics information may include hardware error codes, ECM error/fault codes, TCM error/fault codes, VFD error/fault codes, and actuator sensor interface (AS-i) master error/fault codes, among other examples. The error code diagnostics information may also be logged or otherwise recorded to internal and/or external memory, including as described below with respect to the logging tool 560.

The watchdog diagnostic tool 545 performs watchdog diagnostics for monitoring communications and identifying problems with various instances of the control hardware 400 of the additive system 200 and the CAM system 300. For example, the watchdog diagnostics may be utilized to check communications by periodically checking the status of a counter that is passed back and forth between instances of the control hardware 400. Watchdog diagnostics may also be utilized to permit two instances of the control hardware 400 to monitor the health of each other. Watchdog diagnostics may also generate time-out alarms for actuators and/or other components of the additive system 200, such as by comparing a set point with state feedback, such that when an actuator or other process control command is issued and the feedback signal does not reflect the intended action after a set period of time, then an alarm may be triggered. Such errors may be triggered by faulty instances of the sensors 204, 214, 222, the controllable devices 218, 226, a power source, and/or other examples. Identified possible root causes may also be listed in a troubleshooting guide and/or displayed via one or more of the HMIs 228, 310, 316.

Watchdog diagnostics may also provide valve control and monitoring. For example, when a valve is commanded to open or close, a watchdog timer may be initiated such that after a predetermined period of time (e.g., about five seconds) the actual valve status or position may be checked. If the valve is not in the intended position, the watchdog diagnostic tool 545 may trigger a valve actuator time-out alarm for the particular valve. During operations of the additive system 200, watchdog diagnostics may also verify whether the actual valve position is within an error tolerance of the set point. Watchdog diagnostics may also monitor hardware for fault conditions. For example, position-controlled valves may have a configurable error tolerance, and the results of tests that may be performed as part of the watchdog diagnostics may be made available to human operators via one or more of the HMIs 228, 310, 316.

The watchdog diagnostics information, including information relating to warnings, errors, and/or faults, may be logged or otherwise recorded to internal and/or external memory, including as described below with respect to the logging tool 560.

The application diagnostic tool 550 performs application diagnostics for monitoring health of software and/or firmware applications of the additive system 200 and/or the CAM system 300. Examples of application diagnostics information may include processor usage, memory usage, disk usage, error codes, and crash reports, among others. The application diagnostics information may be logged in a file and viewed by a software engineer when problems with the application are detected. Crash reports may contain pertinent information about the state of the application, such as the line where the problem occurred and the call stack information when the problem occurred. Application diagnostics may also include items related to the functionality of the additive system 200 and/or the CAM system 300. For example, if communication with a material transferring device 254 is lost, information such as handshake value, time between the handshake send and receipt, processor load, network load, and memory usage may be logged to help identify possible causes. The application diagnostics information may also be logged or otherwise recorded to internal and/or external memory, including as described below with respect to the logging tool 560.

The wireless diagnostic tool 555 performs wireless diagnostics for monitoring the health of the local network 302. For example, the local network 302 may comprise a master node and multiple slave nodes, wherein each master and slave node may be implemented via an instance of the control hardware 400. Wireless diagnostics may include analyzing and logging information such as node temperature, up time, link time, firmware version, service set identifier (SSID), internet protocol (IP) address, and/or mode (e.g., master, repeater, slave), as well as signal strength, current data transfer rate (i.e., modulation and coding scheme (MCS) value), and signal to noise ratio (SNR).

The wireless diagnostic tool 555 may be operable to inform a human operator that a wireless communication path is or may be compromised, such as when the wireless signal is weak or wireless signal interference exists, in which case a wired communication path may be established to replace the faulty wireless communication path. The wireless diagnostic tool 555 may include or control lights and/or other indicators viewable via one or more of the HMIs 228, 310, 316, such as in implementations utilizing indicators of different colors to inform a human operator as to the degree of the problem. Wireless diagnostics may also include detecting wireless communication transmission rates, such as may be indicative of bandwidth limitations of the additive system 200, the CAM system 300, the local network 302, and/or the external network 304. For example, a specific amount of data (e.g., packets) may be transmitted per unit of time, depending on the specific implementation of the additive system 200, the CAM system 300, the local network 302, and/or the external network 304, and such transmission rate may be utilized to estimate whether a master or other network node will be able to transmit sufficient data to the connected hardware. Wireless diagnostics may also include detecting additional master network nodes, such as for determining whether the master network node at a wellsite is sufficiently close to another master network node in the general vicinity to cause interference and/or other communication problems, which may be the case if both master network nodes have the same SSID, among other potential problems.

The wireless diagnostic information may also be logged or otherwise recorded to internal and/or external memory, including as described below with regard to the logging tool 560.

The logging tool 560 performs logging activities of various operational parameters associated with various components of the additive system 100 and the CAM system 300. For example, the monitoring, control, and/or other diagnostic information described above may be utilized to provide support to human operators during the various operational failures, issues, and problems described above (among others). Such support may include the generation of a "ticket," whether automatically by one of the diagnostic tools, manually by a human operator, or otherwise. The ticket may then be referred to appropriate personnel having expertise related to the process being performed by the additive system 200, the control thereof, the particular component of the additive system 200 that is exhibiting the problem, and/or other areas. The ticket may include electronic records such as job files, data acquisition files, and other examples of diagnostic information as described above. For example, the contents of the job and acquisition files may include modes (e.g., manual, automatic, remote), settings (e.g., what type of component, engine, transmission, gate type), process/sensor readings, process/control set points, firmware/software versions, and/or other information generated by the diagnostic tools. Each job and/or acquisition file may be a log of such information, spanning the time period extending from start to finish of the operation, process, utilization of an application, etc., because if some of such information is not logged, subsequent issues may be unresolvable, which may lead to repeated job incidents and lost time.

The logging tool 560 may also provide a repository for information that may be utilized for later analysis in the event of an incident or audit. For example, the logging tool 560 may log pump fuel rates, engine speeds, engine loads, and/or other information that the U.S. Environment Protection Agency may request for determining emissions data. Another example is in the event of an overpressure incident, in which case knowledge of the highest pressure achieved by one or each component of the additive system 200 may be a basis to remedying the overpressure and/or preventing similar incidents in the future. As another example, the logging tool 560 may record the highest raw value pressure to which a treating iron has been subjected in the last ten seconds, such as to assess whether the life of the treating iron has been diminished.

The logging tool 560 may also be operable to consolidate or otherwise combine various different logs into a single file or a single view/display. Such combination of logs may eliminate the burden of a human operator having to know the location of the individual log files and/or manually combine the data using time stamps before the complete job log file is compiled after operations have ended.

The logging tool 560 may also be utilized for verifying reliability. From a single location point of view, the logging tool 560 may query and/or consolidate various log files to show diagnostic and alarm information, which may aid in quantifying reliability. From a project point of view, the logging tool 560 may aid in consolidating the diagnostic and alarm information, which may then be communicated via the external network 304 to remote components for reliability analysis.

The predictive maintenance tool 565 performs predictive maintenance operations, such as for providing remaining functional life estimates. Predictive maintenance operations may facilitate greater reliability of the additive system 200 by utilizing the logged information associated with various components of the additive system 200 to generate functional life profiles for predicting or otherwise determining remaining functional life of the components. Predicting remaining functional life of components may permit in-time servicing and maintenance of the components, such as to avoid costly failures or extend the lifetime of these components. In contrast to condition monitoring, predicting remaining functional life according to one more aspects of the present disclosure may aid in preventing failures before they occur, rather than detecting failures after they occur.

The predictive maintenance tool 565 may include or control various maintenance alarms to inform human operators of a predetermined maintenance schedule, a remaining functional life, and/or other maintenance-related aspects of certain components of the additive system 200. For example, the alarms may be triggered when values of certain monitored and perhaps logged parameters exceed, fall below, or fall within a predetermined or selected threshold and/or range. The predictive maintenance operations may also utilize certain monitored and logged parameter values over the functional life of components for the creation of a historical database of functional life profiles of the various components, which may be utilized to obtain the predetermined or selected threshold and/or range associated with the alarms. The historical database of functional life profiles may also aid in identifying those parameters that have greater affect on the functional life of such components and/or those parameters that more accurately and/or reliably indicate remaining functional life. As the database progressively expands, the increase in functional life profiles may facilitate an increasingly more accurate process for estimating the remaining functional life of the components and/or the additive system 200 as a whole.

Examples of the components for which predictive maintenance operations may be performed via the predictive maintenance tool 565 include the prime movers described above, such as motors or engines, which may be monitored via communication with a drive, throttle, and/or other controllable device(s) utilized to control the prime mover via the SCM device 306 and/or other portions of the CAM system 300. For example, feedback signals from the prime mover, the associated sensors, and/or other components may be utilized during predictive maintenance operations to provide human operators with operating rates, frequencies, and/or other operational parameters of the prime mover in real-time. Other examples of logged parameters that are associated with the prime mover may include bearing temperature, hot spot temperature, current draw, time-based voltage, power consumption, rotational position, torque output, frame acceleration, and operating time. Additional examples of logged parameters associated with the prime mover may indicate dates of engine oil, transmission fluid, and other fluid changes, as well as servicing of filters, air systems, and other components, including with respect to date, operating hours (i.e., elapsed functional life), and/or other factors.

Additional examples of the components for which predictive maintenance operations may be performed via the predictive maintenance tool 565 include the material transferring devices described above, such as pumps, conveyers, bucket elevators, feeding screws, and other material transfer devices, as well as metered distribution means of dry or particulate material. For example, the predictive maintenance operations may include predicting the remaining functional life of a pump based on logged or calculated slip increase or efficiency loss, such as may be caused by wear. Similar approaches may be utilized for other material transferring and/or metering means, as the efficiency of such means decreases with wear.

The predictive maintenance operations may also be performed with respect to the efficiency of various pumps of the additive system 200. Pump efficiency may be defined as the ratio of the actual pump displacement to a theoretical pump displacement, such as may be described by related pump specification documents. Such definition of the pump efficiency may be utilized during predictive maintenance operations for real-time monitoring and failure prediction of one or more pumps. Pump displacement may be determined from real-time feedback relating to speed of the associated prime mover and information obtained via one or more from the material sensor and/or other sensors. Thus, pump efficiency may be determined utilizing Equation (1) set forth below:

$$PE = \frac{Q}{RPM \times TPD} \times 100 \tag{1}$$

wherein PE denotes pump efficiency in percent (%), Q denotes flow rate in gallons per minute (GPM), RPM denotes speed of the associated prime mover in revolutions per minute (RPM), and TPD denotes theoretical pump displacement in gallons per revolution (gal/rev).

A similar formula may be utilized to determine efficiency of a solid material transfer device. For example, such efficiency may be determined as the ratio of the quantity of solid material actually displaced, per revolution of a component of the transfer device or associated prime mover, to the quantity that would be displaced with a new instance of the solid material transfer device (i.e., at the beginning of its functional life). When transferring solid material, additional data may also be logged with respect to parameters that affect the displacement of the solid material, such as humidity, motor speed, and particle size.

Pump displacement may also differ for different fluids. For example, viscous fluids create less slip and are therefore displaced differently by a pump. In the case of non-Newtonian fluids, for which viscosity depends on the shear rate, the pump displacement may further depend on the pump speed. Therefore, for shear-thinning fluids, additional parameter data may be logged to determine pump displacement for different types of fluids and at different pump speeds. However, for solid material, parameter data may also be logged at different transfer device (or associated prime mover) speeds to account for various dynamics of the transfer process, such as variations in friction of the moving solid material.

When transferring Newtonian fluids, pump displacement may be calculated for each Newtonian fluid at different temperatures. Pump efficiency may then be monitored and logged over time for each such fluid to create a database. For example, during operations conducted with the additive system, pumps may be run up to the point of inefficient, or even to the point of failure, which may facilitate creation of efficiency loss profiles spanning the functional life of the pump. These efficiency loss profiles may then be utilized to estimate remaining functional life of that and/or other similar pumps. For example, current use, conditions, and/or sensor readings associated with the pump may be compared to an efficiency loss profile in the database generated under the same or similar use, conditions, and/or sensor readings. The position along the efficiency loss profile where a match is made with current sensor readings may be indicative of the remaining functional life of the pump under the same or similar conditions.

When additive systems are utilized to transfer non-Newtonian fluids, pump speed may also be logged for creating efficiency loss profiles, because viscosity and, therefore, pump displacement, depends on pump speed. Thus, theoretical or initial pump displacement may be collected for each fluid at different temperatures and different pump speeds. Thereafter, pump efficiency may be monitored and logged over time for each such fluid at different temperatures and flow rates to create the database of efficiency loss profiles.

More advanced monitoring may also be achieved by acquiring the same data at different discharge pressures, because discharge pressure affects pump displacement for both Newtonian and non-Newtonian fluids. Therefore, discharge pressure changes may also affect the determination of pump efficiency.

Another method for calculating pump efficiency may include monitoring suction pressure measurements during priming operations. For example, when pump slip increases (i.e., when pump efficiency decreases), the pump may not achieve the same vacuum levels as a new pump, thereby indicating an efficiency loss.

Other logged parameters associated with the material transfer devices may include temperature, pressure, power consumption, proximity, linear position, rotational position, operating rate or frequency, material transfer rate, total material transferred, torque, acceleration, and operating time. However, other examples of such parameters are also within the scope of the present disclosure.

The predictive maintenance operations may also include generating similar functional life profiles for other components of the additive system based on other parameters. Above-described examples of such other components may include the material container 240, the valves 244, 264, the actuators 248, 266, the material sensor 260, and the material destination 270, among others. For example, these components may also be run up to the point of inefficiency, or to the point of failure, while logging information generated by the sensors 204, 214, 222. The logged sensor and/or other information may then be utilized to generate functional life loss profiles spanning the life of the components. The functional life profiles may then be utilized to estimate remaining functional life of the components. For example, current use, conditions, and/or sensor readings associated with the components may be compared to the functional life profile in the database generated under the same or similar use, conditions, and/or sensor readings. The position along the functional life profile where a match is made with current sensor readings may be indicative of the remaining functional life of the component under the same or similar use and/or conditions.

It follows from the above discussion that predicting or determining remaining functional life of some components may depend on accuracy of various material sensors, such as the material sensor 260 depicted in FIG. 3 when implemented as a flow meter. Therefore, to obtain a robust remaining functional life prediction, the monitoring and logging methods described above may also be applied to the flow meter. For example, some flow meters and other such material sensors may include built-in, embedded, or otherwise associated health management means, such as may utilize additional sensors included with or otherwise associated with the material sensor, and such health management means may also be operable to generate corresponding functional life profiles of the material sensors. The data generated by the associated health management means may also be utilized to predict the impact that the measuring operations have on the measuring performance over time. The health management means may also be utilized to schedule servicing time, and/or to monitor product quality, such as by detecting gas pockets in the various materials being utilized during operation of the additive systems. Generating such prediction, servicing, and/or monitoring information may also include comparing factory values associated with the material sensor to current values generated by the health management means. Differences between the current values and the factory values may thus be utilized to service the material sensor over time, and/or to determine remaining functional life of the material sensor.

Other methods for monitoring the material sensors may include utilizing information obtained via other sensors associated with the upstream source of material from which material is being transferred past the material sensor. For example, in the example additive system 201 shown in FIG. 3, such information may be obtained via the sensors 204 associated with the container 240 in which fluidic or solid material is stored before being transferred by the material transfer device 254. One or more known material quantity sensing methods may be utilized to measure the quantity of material in the container 240, wherein the material quantity sensing methods may utilize the level measuring means, the volume measuring means, and the weight measuring means, as described above. After calibration, readings from the sensors 204 may be related to the level, volume, and/or weight of material remaining in the container 240. However, while the accuracy of the sensors 204 and the size of the container 240 alone may not permit real-time flow measurement, material quantity readings may be taken before and after a job, and such readings may permit the determination of the cumulative volume and/or mass of material that has been transferred out of the container 240. The cumulative value may then be compared to the cumulative value obtained from the flow meter, which may then permit detection of inaccuracies of the material sensor 260. Therefore, for example, if the calibration of the material sensor 260 becomes offset, such as because an inner tube or other component of the material sensor 260 has suffered corrosion, the comparison of the total quantities of the material transferred may permit recalibration of the material sensor 260. Moreover, discrepancies between the two readings that exceed predetermined thresholds may be utilized by the predictive maintenance operations to indicate that maintenance or replacement of the material sensor 260 may be in order.

One or more instances of the material sensors 260 may also include one or more pressure transducers operable to monitor suction and discharge pressure within the additive system. In a manner similar to that described above with respect to other components of the additive system, the predictive maintenance operations may also include monitoring and/or logging data from the pressure transducers to predict their remaining functional life. Monitoring and logging fluid characteristics, such as density, viscosity, temperature, composition, pumping rate, and time spent at high pressure, for example, through the functional lifetime of the pressure transducers may also be utilized to generate a database of functional life profiles, which may then be utilized to determine remaining functional life of same or similar pressure transducers when utilized under same or similar conditions.

Various parameters associated with valves and actuators, such as the valves 244, 264 and actuators 248, 266 depicted in FIG. 3, may also be monitored and logged to create functional life profiles, which may then be utilized to determine remaining functional life of same or similar valves and actuators when utilized under same or similar conditions. The monitored and logged parameters may include material temperature, pressure, material transfer rate, number of cycles, cycling frequency, number of times an associated controller times out (e.g., because the valve is stuck), and actuation time (i.e., time between the command and the end of the action), among other examples.

If several additive systems are operated at the same wellsite, or at different wellsites in the same general vicinity, cross checking among the additive systems may also be utilized to monitor the health of the additive systems. For example, a flow meter associated with a first additive system may be utilized to measure the efficiency of a material transfer device of a second additive system. The accuracy of the remaining functional life determinations may also increase with additional functional life profiles. However, some profiles will not be available at the beginning of a job, so the above-described monitoring and logging may be first implemented when pumping water at the beginning and the end of a job.

Other logged information that may also be available to human operators via one or more of the HMIs 228, 310, 316 during operation of the additive system may include hours of operation of various components of the additive system, number of cycles of the components, and amounts of material transferred by material transfer devices. Human operators may also have the ability to select additional parameters to be monitored and logged for one or more components of the additive system.

Figure 6:
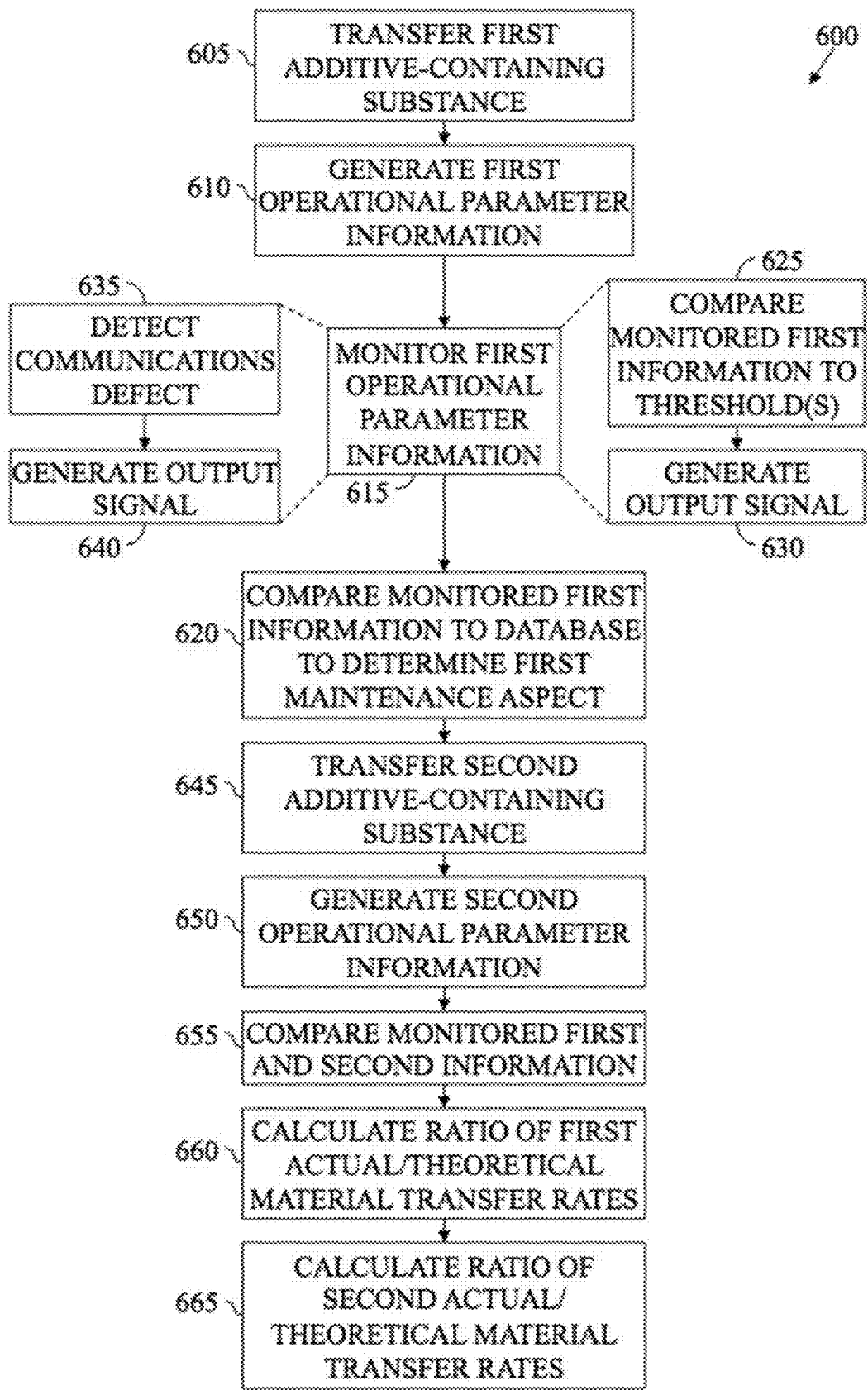
FIG. 6 is a flow-chart diagram of at least a portion of a method according to one or more aspects of the present disclosure.

FIG. 6 is a flow-chart diagram of at least a portion of a method (600) according to one or more aspects of the present disclosure. The method (600) may be performed utilizing at least a portion of one or more implementations of the apparatus shown in one or more of FIGS. 1-5 and/or otherwise within the scope of the present disclosure.

The method (600) comprises transferring (605) an additive-containing substance for injection into a wellbore with an oilfield additive system. The oilfield additive system may be an instance of the generic additive system 200 shown in FIG. 2, such as may be implemented in the context of the additive system 100 shown in FIG. 1 in the manner depicted in FIG. 3, although other examples are also within the scope of the present disclosure. In each such example, however, the oilfield additive system includes a plurality of components each associated with a corresponding operational parameter.

Information related to the operational parameter of each of the plurality of components is generated (610) with a corresponding one of a plurality of sensors, such as sensors of or otherwise associated and/or communicable with the oilfield additive system. The information generated (610) by the plurality of sensors are recorded and/or otherwise monitored (615) via a monitoring device, such as the SCM device 306 and/or other component of the CAM system 300 shown in FIGS. 2 and 3, to generate a database indicative of a maintenance aspect of an item, wherein the item is the oilfield additive system as a whole, at least one of the plurality of components of the oilfield additive system, and/or a combination thereof.

The maintenance aspect may be, or may be indicative of, an estimated remaining functional life of the item. As described above, the estimated remaining functional life may be an estimate of remaining operational time until failure of the item and/or an estimate of remaining operational time until operational efficiency of the item falls below a predetermined threshold. The maintenance aspect may also be, or be indicative of, the health of the item. The method (600) may also comprise comparing (620) the information related to the operational parameter of a selected one of the oilfield additive system components with the database to determine the maintenance aspect of the item.

As described above, the oilfield additive system components may include a prime mover and a material transfer device operable in conjunction with the prime mover. Thus, generating (610) the information related to the operational parameter of each of the oilfield additive system components may include generating information related to the operational parameter of the prime mover with a first sensor, and generating information related to the operational parameter of the material transfer device with a second sensor.

The information generated (610) by one of the sensors may include information related to performance of the corresponding one of the oilfield additive system components. The information generated (610) by one of the sensors may also include information related to a property of the additive-containing substance, such as in implementations in which the property is temperature, viscosity, density, composition, and/or other properties. The operational parameter may also be temperature, pressure, flow rate, electrical current, power consumption, operating speed, operating frequency, torque, position, elapsed operating time, and/or other operational parameters.

The monitoring (615) may also include comparing (625) the information generated by the sensors to predetermined thresholds, and generating (630) an output signal based on the comparison (625). For example, the generated (630) output signal may be for controlling one or more oilfield additive system component, and/or may be displayed to human operators via an HMI, such as one or more of the HMIs 228, 310, 316 shown in FIG. 2.

As also described above, the oilfield additive system may include or be operable in conjunction with a communication system operable to facilitate communication between the oilfield additive system components. For example, such communication system may include one or more I/O modules each communicable with one or more of the sensors and/or oilfield additive system components, a controller or other processor communicable with one or more of the I/O modules, and an HMI communicable with the processor. Thus, the monitoring (615) may also or instead include detecting (635) a defect in communications between two or more of the I/O modules, the processor, and the HMI, and generating (640) an output signal when the defect is detected (635).

In an example implementation, the additive system, the additive-containing substance, the wellbore, the additive system components, the sensors, the generated (610) information, and the operational parameter may be a first additive system, a first additive-containing substance, a first wellbore, first additive system components, first sensors, first information, and a first operational parameter, respectively, and the method (600) may also include transferring (645) a second additive-containing substance for injection into a second wellbore with a second additive system comprising second additive components each associated with a corresponding second operational parameter, generating (650) second information related to the second operational parameter of each of the second additive system components with a corresponding one of a plurality of second sensors, and comparing (655) at least portions of the first information and the second information to determine the maintenance aspect of the item. In such implementations, the first and second additive-containing substances may be substantially the same or different, and the first and second wellbores may be the same or different wellbores.

For example, the first additive system components may include a first material transfer device, the second additive system components may include a second material transfer device, the item may be the first material transfer device, the compared (655) portion of the first information may be indicative of a first efficiency of the first material transfer device, and the compared (655) portion of the second information may be indicative of a second efficiency of the second material transfer device. Such implementations of the method (600) may also include calculating (660) a first ratio of a first actual material transfer rate of the first material transfer device to a first theoretical material transfer rate of the first material transfer device to determine the first efficiency, and calculating (665) a second ratio of a second actual material transfer rate of the second material transfer device to a second theoretical material transfer rate of the second material transfer device to determine the second efficiency.

In view of the entirety of the present disclosure, including the claims and the figures, a person having ordinary skill in the art should readily recognize that the present disclosure introduces an apparatus comprising a monitoring system operable to monitor an oilfield additive system, wherein the oilfield additive system is operable to transfer an additive-containing substance for injection into a wellbore, wherein the oilfield additive system comprises a plurality of components each associated with a corresponding operational parameter, and wherein the monitoring system comprises: a plurality of sensors each associated with, and operable to generate information related to the operational parameter of, a corresponding one of the plurality of components; and a monitoring device in communication with each of the plurality of sensors and operable to record the information generated by the plurality of sensors to generate a database indicative of a maintenance aspect of an item, wherein the item is at least one of: the oilfield additive system; at least one of the plurality of components; and/or a combination thereof.

The maintenance aspect may be, or may be indicative of, an estimated remaining functional life of the item. The estimated remaining functional life may be an estimate of remaining operational time until failure of the item. The estimated remaining functional life may be an estimate of remaining operational time until operational efficiency of the item falls below a predetermined threshold.

The maintenance aspect may be, or may be indicative of, a health of the item.

The plurality of components may comprise a prime mover and a material-transfer device operable in conjunction with the prime mover, and the plurality of sensors may comprise: a first sensor operable to generate information related to the operating parameter of the prime mover; and a second sensor operable to generate information related to the operating parameter of the material-transfer device. The material-transfer device may be operable to transfer a fluid, a solid material, or a mixture comprising a fluid and a solid material. For example, the material-transfer device may be operable to transfer subterranean formation fracturing fluid and/or wellbore casing cement.

The oilfield additive system, the additive-containing substance, the wellbore, the plurality of components, the plurality of sensors, the information, and the operational parameter may, respectively, be a first oilfield additive system, a first additive-containing substance, a first wellbore, a first plurality of components, a first plurality of sensors, first information, and a first operational parameter. In such implementations, among others within the scope of the present disclosure, the monitoring system may be further operable to monitor a second oilfield additive system operable to transfer a second additive-containing substance for injection into a second wellbore. The second oilfield additive system may comprise a second plurality of components each associated with a corresponding second operational parameter. The monitoring system may further comprise a second plurality of sensors each associated with, and operable to generate second information related to the second operational parameter of, a corresponding one of the second plurality of components. The maintenance aspect of the item may be based on a comparison of at least portions of the first information and the second information. The first and second additive-containing substances may be substantially the same. The second wellbore may be the first wellbore. The first plurality of components may comprise a first material-transfer device, the second plurality of components may comprise a second material-transfer device, the item may be the first material-transfer device, the compared portion of the first information may be indicative of a first efficiency of the first material-transfer device, and the compared portion of the second information may be indicative of a second efficiency of the second material-transfer device. The first efficiency may be based on a first ratio of a first actual material transfer rate of the first material-transfer device to a first theoretical material transfer rate of the first material-transfer device, and the second efficiency may be based on a second ratio of a second actual material transfer rate of the second material-transfer device to a second theoretical material transfer rate of the second material-transfer device.

The information generated by one of the plurality of sensors may comprise information related to performance, efficiency, and/or accuracy of the corresponding one of the plurality of components.

The information generated by one of the plurality of sensors may comprise information related to a property of the additive-containing substance. The property may be selected from the group consisting of: temperature, viscosity, density, and composition.

The operational parameter may be selected from the group consisting of: temperature, pressure, flow rate, electrical current, power consumption, operating speed, operating frequency, torque, position, and elapsed operating time.

The monitoring device may be further operable to: compare the information generated by the plurality of sensors to predetermined thresholds; and generate an output signal based on the comparison.

The apparatus may further comprise a communication system operable to facilitate communication between the plurality of components and the monitoring system. The communication system may comprise: an input/output module in communication with the plurality of sensors and the monitoring device; and a human/machine interface in communication with the monitoring device. In such implementations, among others within the scope of the present disclosure, the monitoring system may be further operable to: detect a defect in communications between the input/output module, the monitoring device, and the human/machine interface; and generate an output signal when the defect is detected.

The present disclosure also introduces a method comprising: transferring an additive-containing substance for injection into a wellbore with an oilfield additive system, wherein the oilfield additive system comprises a plurality of components each associated with a corresponding operational parameter; generating information related to the operational parameter of each of the plurality of components with a corresponding one of a plurality of sensors; and recording the information generated by the plurality of sensors with a monitoring device to generate a database indicative of a maintenance aspect of an item, wherein the item is at least one of: the oilfield additive system; at least one of the plurality of components; and/or a combination thereof.

The maintenance aspect may be, or may be indicative of, an estimated remaining functional life of the item. The estimated remaining functional life may be an estimate of remaining operational time until failure of the item. The estimated remaining functional life may be an estimate of remaining operational time until operational efficiency of the item falls below a predetermined threshold.

The maintenance aspect may be, or may be indicative of, a health of the item.

The method may further comprise comparing the information related to the operational parameter of a selected one of the plurality of components with the database to determine the maintenance aspect of the item.

The plurality of components may comprise a prime mover and a material-transfer device operable in conjunction with the prime mover, and generating information related to the operational parameter of each of the plurality of components with the corresponding one of the plurality of sensors may comprise: generating information related to the operational parameter of the prime mover with a first sensor; and generating information related to the operational parameter of the material-transfer device with a second sensor.

The oilfield additive system, the additive-containing substance, the wellbore, the plurality of components, the plurality of sensors, the information, and the operational parameter may, respectively, be a first oilfield additive system, a first additive-containing substance, a first wellbore, a first plurality of components, a first plurality of sensors, first information, and a first operational parameter. In such implementations among others within the scope of the present disclosure, the method may further comprise: transferring a second additive-containing substance for injection into a second wellbore with a second oilfield additive system, wherein the second oilfield additive system comprises a second plurality of components each associated with a corresponding second operational parameter; generating second information related to the second operational parameter of each of the second plurality of components with a corresponding one of a second plurality of sensors; and comparing at least portions of the first information and the second information to determine the maintenance aspect of the item. The first and second additive-containing substances may be substantially the same. The second wellbore may be the first wellbore. The first plurality of components may comprise a first material-transfer device, the second plurality of components may comprise a second material-transfer device, the item may be the first material-transfer device, the compared portion of the first information may be indicative of a first efficiency of the first material-transfer device, and the compared portion of the second information may be indicative of a second efficiency of the second material-transfer device. The method may further comprise: determining a first ratio of a first actual material transfer rate of the first material-transfer device to a first theoretical material transfer rate of the first material-transfer device to determine the first efficiency; and determining a second ratio of a second actual material transfer rate of the second material-transfer device to a second theoretical material transfer rate of the second material-transfer device to determine the second efficiency.

The information generated by one of the plurality of sensors may comprise information related to performance, efficiency, and/or accuracy of the corresponding one of the plurality of components.

The information generated by one of the plurality of sensors may comprise information related to a property of the additive-containing substance. The property may be selected from the group consisting of: temperature, viscosity, density, and composition.

The operational parameter may be selected from the group consisting of: temperature, pressure, flow rate, electrical current, power consumption, operating speed, operating frequency, torque, position, and elapsed operating time.

Monitoring the oilfield additive system may further comprise: comparing the information generated by the plurality of sensors to predetermined thresholds; and generating an output signal based on the comparison.

The oilfield additive system may further comprise a communication system operable to facilitate communication between the plurality of components, wherein the communication system comprises: an input/output module in communication with the plurality of sensors and the plurality of components; a controller in communication with the input/output module; and a human/machine interface in communication with the controller. In such implementations, among others within the scope of the present disclosure, monitoring the oilfield additive system may further comprise: detecting a defect in communications between the input/output module, the controller, and the human/machine interface; and generating an output signal when the defect is detected.

The present disclosure also introduces a system comprising: an oilfield additive system operable to transfer a material for injection into a wellbore, wherein the oilfield additive system comprises a plurality of components; a monitoring system operable to monitor the oilfield additive system, wherein the monitoring system comprises: a plurality of sensors each associated with, and operable to generate information related to operational parameters of, a corresponding one of the plurality of components; and a monitoring device in communication with each of the plurality of sensors and operable to record the information generated by the plurality of sensors to generate a database, wherein the database is indicative of a maintenance aspect of the oilfield additive system and/or at least one of the plurality of components.

The maintenance aspect may be, or may be indicative of, an estimated remaining functional life of the oilfield additive system and/or at least one of the plurality of components. The estimated remaining functional life may be an estimate of remaining operational time until failure of the oilfield additive system and/or at least one of the plurality of components. The estimated remaining functional life may be an estimate of remaining operational time until operational efficiency of the oilfield additive system and/or at least one of the plurality of components falls below a predetermined threshold.

The maintenance aspect may be, or may be indicative of, a health of the oilfield additive system and/or at least one of the plurality of components.

A comparison between the information related to the operational parameters of a selected one of the plurality of components and the database may be indicative of the maintenance aspect of the oilfield additive system and/or at least one of the plurality of components.

The plurality of components may comprise a prime mover and a material-transfer device operable in conjunction with the prime mover, and the plurality of sensors may comprise: a first sensor operable to generate information related to the operating parameter of the prime mover; and a second sensor operable to generate information related to the operating parameter of the material-transfer device.

The oilfield additive system, the additive-containing substance, the wellbore, the plurality of components, the plurality of sensors, the information, and the operational parameter may, respectively, be a first oilfield additive system, a first additive-containing substance, a first wellbore, a first plurality of components, a first plurality of sensors, first information, and a first operational parameter. In such implementations, among others within the scope of the present disclosure, the monitoring system may be further operable to monitor a second oilfield additive system operable to transfer a second additive-containing substance for injection into a second wellbore. The second oilfield additive system may comprise a second plurality of components each associated with a corresponding second operational parameter. The monitoring system may further comprise a second plurality of sensors each associated with, and operable to generate second information related to the second operational parameter of, a corresponding one of the second plurality of components. The maintenance aspect of the first oilfield additive system and/or at least one of the first plurality of components may be based on a comparison of at least portions of the first information and the second information. The first and second additive-containing substances may be substantially the same. The second wellbore may be the first wellbore. The first plurality of components may comprise a first material-transfer device, the second plurality of components may comprise a second material-transfer device, the compared portion of the first information may be indicative of a first efficiency of the first material-transfer device, and the compared portion of the second information may be indicative of a second efficiency of the second material-transfer device. The first efficiency may be based on a first ratio of a first actual material transfer rate of the first material-transfer device to a first theoretical material transfer rate of the first material-transfer device, and the second efficiency may be based on a second ratio of a second actual material transfer rate of the second material-transfer device to a second theoretical material transfer rate of the second material-transfer device.

The information generated by one of the plurality of sensors may comprise information related to performance, efficiency, and/or accuracy of the corresponding one of the plurality of components.

The information generated by one of the plurality of sensors may comprise information related to a property of the additive-containing substance. The property may be selected from the group consisting of: temperature, viscosity, density, and composition.

The operational parameter may be selected from the group consisting of: temperature, pressure, flow rate, electrical current, power consumption, operating speed, operating frequency, torque, position, and elapsed operating time.

The monitoring device may be further operable to: compare the information generated by the plurality of sensors to predetermined thresholds; and generate an output signal based on the comparison.

The system may further comprise a communication system operable to facilitate communication between the plurality of components and the monitoring system. The communication system may comprise: an input/output module in communication with the plurality of sensors and the monitoring device; and a human/machine interface in communication with the monitoring device. In such implementations, among others within the scope of the present disclosure, the monitoring system may be further operable to: detect a defect in communications between the input/output module, the monitoring device, and the human/machine interface; and generate an output signal when the defect is detected.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. An apparatus, comprising:
   a monitoring system operable to monitor an oilfield additive system, wherein the oilfield additive system is operable to transfer an additive-containing substance for injection from a wellsite surface into a wellbore during a hydraulic fracturing operation of a subterranean formation penetrated by the wellbore, wherein the hydraulic fracturing operation is performed using the additive-containing substance, wherein the oilfield additive system comprises a plurality of components each associated with a corresponding operational parameter, and wherein the monitoring system comprises:
   a plurality of sensors each associated with, and operable to generate information related to the operational parameter of, a corresponding one of the plurality of components; and
   a monitoring device in communication with each of the plurality of sensors and operable to determine an estimated remaining functional life of at least one of the plurality of components based at least in part on one or more functional life profiles stored in a historical database, wherein the one or more functional life profiles are based on historical data that correlates functional life with historical components and associated operational parameters.

2. The apparatus of claim 1, wherein the information generated by one of the plurality of sensors comprises information related to a property of the additive-containing sub stance.

3. The apparatus of claim 1, wherein the estimated remaining functional life is an estimate of remaining operational time until failure of the at least one of the plurality of components and/or operational efficiency of the at least one of the plurality of components falling below a predetermined threshold.

4. The apparatus of claim 1, wherein the plurality of components comprises a prime mover and a material-transfer device operable in conjunction with the prime mover, and wherein the plurality of sensors comprises:

a first sensor operable to generate information related to the operating parameter of the prime mover; and
a second sensor operable to generate information related to the operating parameter of the material-transfer device.

5. The apparatus of claim 1, wherein:
the oilfield additive system, the additive-containing substance, the wellbore, the plurality of components, the plurality of sensors, the information, and the operational parameter are, respectively, a first oilfield additive system, a first additive-containing substance, a first wellbore, a first plurality of components, a first plurality of sensors, first information, and a first operational parameter;
the monitoring system is operable to monitor a second oilfield additive system operable to transfer a second additive-containing substance for injection into the subterranean formation penetrated by a second wellbore;
the second oilfield additive system comprises a second plurality of components each associated with a corresponding second operational parameter;
the monitoring system comprises a second plurality of sensors each associated with, and operable to generate second information related to the second operational parameter of a corresponding one of the second plurality of components; and
the estimated remaining functional life of the at least one of the plurality of components is based on a comparison of at least portions of the first information and the second information.

6. The apparatus of claim 5, wherein:
the first plurality of components comprises a first material-transfer device;
the second plurality of components comprises a second material-transfer device;
the at least one of the plurality of components is the first material-transfer device;
the portion of the first information used for estimating is indicative of a first efficiency of the first material-transfer device; and
the portion of the second information used for estimating is indicative of a second efficiency of the second material-transfer device.

7. The apparatus of claim 6, wherein:
the first efficiency is based on a first ratio of a first actual material transfer rate of the first material-transfer device to a first theoretical material transfer rate of the first material-transfer device; and
the second efficiency is based on a second ratio of a second actual material transfer rate of the second material-transfer device to a second theoretical material transfer rate of the second material-transfer device.

8. A method, comprising:
transferring an additive-containing substance for injection from a wellsite surface into a wellbore with an oilfield additive system during a hydraulic fracturing operation of a subterranean formation penetrated by the wellbore, wherein the hydraulic fracturing operation is performed using the additive-containing substance, wherein the oilfield additive system comprises a plurality of components each associated with a corresponding operational parameter;
generating information related to the operational parameter of each of the plurality of components with a corresponding one of a plurality of sensors;
recording the information generated by the plurality of sensors with a monitoring device to generate a historical database of one or more functional life profiles indicative of an estimated remaining functional life of at least one of the plurality of components, wherein the one or more functional life profiles are based on historical data that correlates functional life with historical components and associated operational parameters; and
comparing the information related to the operational parameter of a selected one of the plurality of components with the historical database to determine the estimated remaining functional life of the at least one of the plurality of components.

9. The method of claim 8, wherein the oilfield additive system comprises a communication system operable to facilitate communication between the plurality of components, wherein the communication system comprises:
an input/output module in communication with the plurality of sensors and the plurality of components;
a controller in communication with the input/output module; and
a human/machine interface in communication with the controller; and
wherein monitoring the oilfield additive system comprises:
detecting a defect in communications between the input/output module, the controller, and the human/machine interface; and
generating an output signal when the defect is detected.

10. The method of claim 8, wherein the information generated by one of the plurality of sensors comprises information related to a property of the additive-containing sub stance.

11. The method of claim 8, wherein the estimated remaining functional life is an estimate of remaining operational time until failure of the at least one of the plurality of components and/or operational efficiency of the at least one of the plurality of components falling below a predetermined threshold.

12. The method of claim 8, wherein the plurality of components comprises a prime mover and a material-transfer device operable in conjunction with the prime mover, and wherein the plurality of sensors comprises:
a first sensor operable to generate information related to the operating parameter of the prime mover; and
a second sensor operable to generate information related to the operating parameter of the material-transfer device.

13. The method of claim 8, wherein monitoring the oilfield additive system comprises:
comparing the information generated by the plurality of sensors to predetermined thresholds; and
generating an output signal based on the comparison.

14. The method of claim 8, wherein the oilfield additive system, the additive-containing substance, the wellbore, the plurality of components, the plurality of sensors, the information, and the operational parameter are, respectively, a first oilfield additive system, a first additive-containing substance, a first wellbore, a first plurality of components, a first plurality of sensors, first information, and a first operational parameter; and
the method comprises:
transferring a second additive-containing substance for injection into the subterranean formation penetrated by a second wellbore with a second oilfield additive system, wherein the second oilfield additive system comprises a second plurality of components each associated with a corresponding second operational parameter;

generating second information related to the second operational parameter of each of the second plurality of components with a corresponding one of a second plurality of sensors; and comparing at least portions of the first information and the second information to determine the estimated remaining functional life of the at least one of the plurality of components.

15. The method of claim 14, wherein:

the first plurality of components comprises a first material-transfer device;

the second plurality of components comprises a second material-transfer device;

the at least one of the plurality of components is the first material-transfer device;

the compared portion of the first information is indicative of a first efficiency of the first material-transfer device;

the compared portion of the second information is indicative of a second efficiency of the second material-transfer device; and the method comprises:
determining a first ratio of a first actual material transfer rate of the first material-transfer device to a first theoretical material transfer rate of the first material-transfer device to determine the first efficiency; and
determining a second ratio of a second actual material transfer rate of the second material-transfer device to a second theoretical material transfer rate of the second material-transfer device to determine the second efficiency.

16. A system, comprising:
an oilfield additive system operable to transfer a material for injection from a wellsite surface into a wellbore during a hydraulic fracturing operation of a subterranean formation penetrated by the wellbore, wherein the hydraulic fracturing operation is performed using the additive-containing substance, wherein the oilfield additive system comprises a plurality of components;
a monitoring system operable to monitor the oilfield additive system, wherein the monitoring system comprises:
a plurality of sensors each associated with, and operable to generate information related to operational parameters of, a corresponding one of the plurality of components; and
a monitoring device in communication with each of the plurality of sensors and operable to record the information generated by the plurality of sensors to generate a historical database of one or more functional life profiles indicative of an estimated remaining functional life of at least one of the plurality of components, wherein the one or more functional life profiles are based on historical data that correlates functional life with historical components and associated operational parameters.

17. The system of claim 16, wherein the estimated remaining functional life is an estimate of remaining operational time until failure of the at least one of the plurality of components and/or operational efficiency of the at least one of the plurality of components falling below a predetermined threshold.

18. The system of claim 16, wherein the plurality of components comprises a prime mover and a material-transfer device operable in conjunction with the prime mover, and wherein the plurality of sensors comprises:
a first sensor operable to generate information related to the operating parameter of the prime mover; and
a second sensor operable to generate information related to the operating parameter of the material-transfer device.

19. The system of claim 16, wherein the information generated by one of the plurality of sensors comprises information related to a property of the material.

* * * * *